(12) United States Patent
Shirota

(10) Patent No.: US 7,643,223 B2
(45) Date of Patent: Jan. 5, 2010

(54) IMAGE PICKUP APPARATUS HAVING OPTICAL PATH REFLECTING ZOOM LENS SYSTEM

(75) Inventor: Eiji Shirota, Hino (JP)

(73) Assignee: Olympus Imaging Corp., Tokyo (JP)

( * ) Notice: Subject to any disclaimer, the term of this patent is extended or adjusted under 35 U.S.C. 154(b) by 103 days.

(21) Appl. No.: 12/148,802

(22) Filed: Apr. 21, 2008

(65) Prior Publication Data

US 2008/0278824 A1 Nov. 13, 2008

(30) Foreign Application Priority Data

May 10, 2007 (JP) .............................. 2007-125775

(51) Int. Cl.
G02B 15/14 (2006.01)
G02B 17/00 (2006.01)
(52) U.S. Cl. ....................... 359/687; 359/683; 359/684; 359/726
(58) Field of Classification Search ................. 359/683, 359/684, 687, 726
See application file for complete search history.

(56) References Cited

U.S. PATENT DOCUMENTS

| 7,110,186 | B2 | 9/2006 | Sueyoshi |
| 7,242,529 | B2 | 7/2007 | Sato et al. |
| 2004/0233302 | A1 | 11/2004 | Kojima |
| 2006/0274426 | A1 | 12/2006 | Sueyoshi |
| 2008/0143867 | A1* | 6/2008 | Shirota ...................... 348/347 |
| 2009/0040623 | A1* | 2/2009 | Morooka et al. ............ 359/687 |

FOREIGN PATENT DOCUMENTS

| JP | 2004-347712 | 12/2004 |
| JP | 2004-354869 | 12/2004 |
| JP | 2004-354871 | 12/2004 |
| JP | 2006-113565 | 4/2006 |

* cited by examiner

*Primary Examiner*—Scott J Sugarman
(74) *Attorney, Agent, or Firm*—Kenyon & Kenyon LLP

(57) ABSTRACT

An image pickup apparatus having an optical path reflecting zoom lens system includes a zoom lens system, and an image pickup element which is disposed at an image side of the zoom lens system. The zoom lens system includes in order from an object side thereof a first lens unit G1 having a positive refracting power, which includes a reflecting optical member having a reflecting surface which reflects an optical path, a second lens unit G2 having a negative refracting power, a third lens unit G3 having a positive refracting power, a fourth lens unit G4 having a positive refracting power, and an aperture stop S which is disposed between the second lens unit G2 and the fourth lens unit G4. The first lens unit G1 has a position fixed with respect to a position of the image pickup element. At least the second lens unit G2 and the fourth lens unit G4 move and the zooming is carried out from a wide angle end to a telephoto end by changing a distance between each of lens units. The second lens unit G2 includes in order from the object side thereof, a negative lens, a positive lens, and a negative lens.

21 Claims, 16 Drawing Sheets

EFECTIVE IMAGE PICKUP AREA   PHOTOELECTRIC CONVERSION SURFACE

RECORDED AND REPRODUCED IMAGE

EFECTIVE IMAGE PICKUP AREA   PHOTOELECTRIC CONVERSION SURFACE

RECORDED AND REPRODUCED IMAGE

EFECTIVE IMAGE PICKUP AREA   PHOTOELECTRIC CONVERSION SURFACE

RECORDED AND REPRODUCED IMAGE

IMAGE PICKUP APPARATUS HAVING OPTICAL PATH REFLECTING ZOOM LENS SYSTEM

CROSS-REFERENCE TO RELATED APPLICATION

The present application is based upon and claims the benefit of priority from the prior Japanese Patent Application No. 2007-125775 filed on May 10, 2007; the entire contents of which are incorporated herein by reference.

BACKGROUND OF THE INVENTION

1. Field of the Invention

The present invention relates to an image pickup apparatus having an optical path reflecting zoom lens system.

2. Description of the Related Art

In recent years, digital cameras (electronic cameras) have been gathering attention as next generation cameras replacing a silver-salt 35 mm film (135 format) camera. Furthermore, such digital cameras have a several categories in a wide range from a high-function type for professional use to a portable popular type.

A major bottleneck in making thin a depth of the camera has been a thickness of an optical system, particularly (a thickness) from a surface nearest to an object of a zoom lens system, up to an image surface. The mainstream of a camera body thinning technology nowadays has been using a so-called collapsible lens barrel in which, the optical system is protruded from a camera body at the time of taking and is accommodated in the camera body at the time of carrying. However, when the collapsible lens barrel is adopted, a time for a start-up from a lens-accommodated state to a usable state becomes long. Moreover, when a lens unit nearest to the object is let to be movable, it is disadvantageous for water proofing and dust proofing.

Lately, a digital camera in which there is no start-up time (time for protruding out of a lens) to the usable state of a camera as seen in the collapsible barrel, and which is favorable for water proofing and dust proofing, and moreover, which has a structure in which, an optical path (optical axis) of an optical system is allowed to be reflected by a reflecting optical member such as a mirror and a prism for making it a camera having an extremely thin depth, has come out.

Such an optical system is a system in which, a dimension in a direction of depth of the camera is made to be as thin as possible by adjusting an optical path upon reflection to a vertical or a horizontal direction of the camera body by providing a reflecting optical member in the optical system, as a lens unit in which a position of a lens unit nearest to the object is fixed with respect to an image pickup element.

Moreover, currently, in video cameras and digital cameras of a portable category, cameras having an image angle of 30° at a wide angle end have been main stream, and there is a need for further widening of an angle for widening a taking area.

As a zoom lens system in which an optical path reflecting optical system is adopted, having a wide angle, a zoom lens system has been disclosed in Japanese Patent Application Laid-open Publication No. 2004-354871, and Japanese Patent Application Laid-open Publication No. 2004-354869.

SUMMARY OF THE INVENTION

A basic structure of an image pickup apparatus having an optical path reflecting zoom lens system of the present invention includes a zoom lens system and an image pickup element which is disposed at an image side of the zoom lens system, and which changes an formed by the zoom lens system, to an electric signal.

Moreover, the zoom lens system includes in order from an object side thereof a first lens unit having a positive refracting power, which includes a reflecting optical member having a reflecting surface which reflects an optical path, a second lens unit having a negative refracting power, a third lens unit having a positive refracting power, and a fourth lens unit having a positive refracting power.

Further, the zoom lens system includes an aperture stop which is disposed between the second lens unit and the fourth lens unit.

The first lens unit has a position fixed with respect to a position of the image pickup element, at least the second lens unit and the fourth lens unit are movable, and an arrangement is such that, the zooming is carried out from a wide angle end to a telephoto end by changing a distance between each of lens units.

Further, the second lens unit includes in order from the object side thereof, a negative lens element, a positive lens element, and a negative lens element.

Moreover, according to another aspect of the present invention, an image pickup apparatus having an optical path reflecting zoom lens system includes a zoom lens system, and an optical element which is disposed at an image side of the zoom lens system, and which changes an image formed by the zoom lens system to an electric signal.

The zoom lens system includes in order from an object side thereof a first lens unit having a positive refracting power, which includes a reflecting optical member having a reflecting surface which reflects an optical path, a second lens unit having a negative refracting power, a third lens unit having a positive refracting power, a fourth lens unit having a positive refracting power, a fifth lens unit having a positive refracting power, and an aperture stop which is disposed between the second lens unit and the fourth lens unit.

The first lens unit has a position fixed with respect to a position of the image pickup element, and at least the second lens unit and the fourth lens unit move, and the zooming is carried out from a wide angle end to a telephoto end by changing a distance between the various lens units, and the zoom lens system satisfies the following conditional expressions.

$$2.0 < f_1/f_w < 5.0 \quad (1), \text{ and}$$

$$35° < \tan^{-1}(IH_w/f_w) \quad (2)$$

where, $f_1$ denotes a focal length of the first lens unit, $f_w$ denotes a focal length of the entire zoom lens system, at a wide angle end, and $IH_w$ denotes a maximum image height at a wide angle end.

BRIEF DESCRIPTION OF THE DRAWINGS

FIG. 1A shows a state at a wide angle end, FIG. 1B shows an intermediate state, and FIG. 1C shows a state at a telephoto end;

DETAILED DESCRIPTION OF THE INVENTION

Figure 1A:
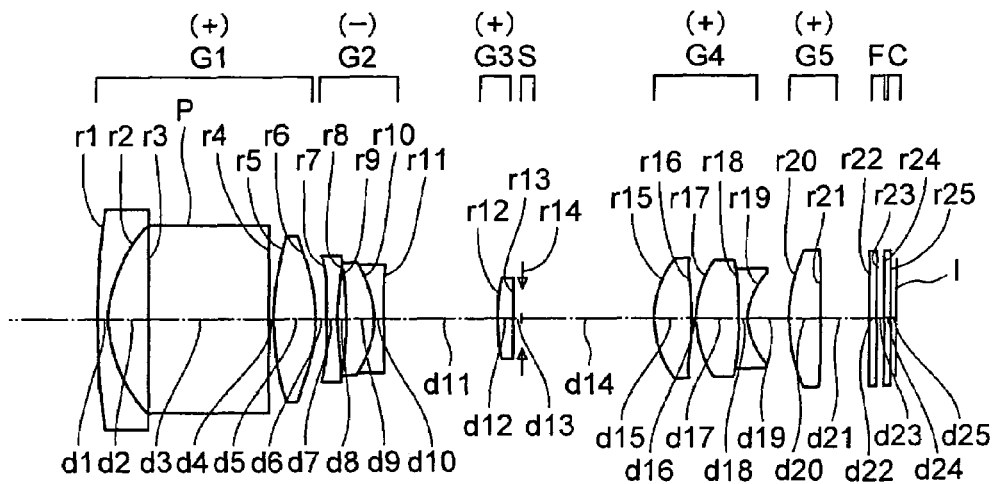
FIG. 1A, FIG. 1B, and FIG. 1C are lens cross-sectional views showing an optical arrangement at the time of infinite object point focusing of a zoom lens system in an image pickup apparatus according to a first embodiment of the present invention, where.

A basic structure of an image pickup apparatus having an optical path reflecting zoom lens system of the present invention includes a zoom lens system and an image pickup element which is disposed at an image side of the zoom lens system, and which changes an image formed by the zoom lens system, to an electric signal.

Moreover, the zoom lens system includes in order from an object side thereof a first lens unit having a positive refracting power, which includes a reflecting optical member having a reflecting surface which reflects an optical path, a second lens unit having a negative refracting power, a third lens unit having a positive refracting power, and a fourth lens unit having a positive refracting power.

Further, the zoom lens system includes an aperture stop which is disposed between the second lens unit and the fourth lens unit.

The first lens unit has a position fixed with respect to a position of the image pickup element, and an arrangement is such that the zooming is carried out from a wide angle end to a telephoto end by changing a distance between various lens units by moving at least the second lens unit and the fourth lens unit.

When such an arrangement is made, it is possible to reflect an optical path by the first lens unit, and to make reduce a thickness in a direction of depth, as well as it is possible to divide a load of zooming (magnification) by moving the second lens unit and the fourth lens unit and to have a high magnification. Moreover, by guiding a light beam emerged from the second lens unit at the wide angle side (end) to the fourth lens unit having a positive refracting power via the third lens unit having a positive refracting power, a diameter of the beam incident on the fourth lens unit can be easily suppressed, which is advantageous for reducing the overall length and the diameter.

Furthermore, by fixing the first lens unit with respect to the image pickup element, the lens is not drawn out at the time of start-up to a usable state of the image pickup apparatus, and it is preferable for water proofing and dust proofing. Moreover, providing the reflecting optical element in the first lens unit is advantageous for reducing a thickness of the image pickup apparatus.

Moreover, in such a structure, it is preferable to have the following arrangement.

It is preferable that the second lens unit is let to have a three-lens structure including in order from the object side thereof, a negative lens, a positive lens, and a negative lens.

Since the second lens unit moves as a zooming lens unit, it is preferable to make a negative refracting power strong for reducing the size of the first lens unit and to secure a zooming ratio, and to impart a zooming load even when an amount of movement is made small. However, in this case, a longitudinal aberration which occurs in the second lens unit is susceptible to occur. Therefore, in the the first aspect of the present invention, by letting the second lens unit have the abovementioned structure, the occurrence of the longitudinal aberration is suppressed by dividing the negative refracting power of the second lens unit by two negative lenses, and by disposing one positive lens between two negative lenses for negating the remained longitudinal aberration, it is possible to carry out an aberration correction efficiently inside the second lens unit by making favorable a symmetry of the lens arrangement in the unit.

Moreover, it is preferable to cement the positive lens in the second lens unit with at least one of the two negative lenses in the second lens unit. Accordingly, an effect of relative decentering of the lenses is suppressed, which is advantageous for suppressing an occurrence of a decentering aberration.

Moreover, it is preferable to cement the positive lens in the second lens unit with only a negative lens on the image side, out of the two negative lenses in the second lens unit. Accordingly, it becomes easy to bring principal points of the second lens unit toward the object side, which is advantageous for making small the diameter of the lens.

Moreover, it is preferable to make an arrangement such that the first lens unit satisfies the following condition expression.

$$2.0 < f_1/f_w < 5.0 \tag{1}$$

where, $f_1$ denotes a focal length of the first lens unit, $f_w$ denotes a focal length of the entire zoom lens system, at a wide angle end.

By suppressing the refracting power of the first lens unit to a moderate level by making an arrangement such that a value is not lower than the lower limit value in the conditional expression (1), it becomes easy to suppress an occurrence of a spherical aberration and an astigmatism of the first lens unit. Securing the refracting power of the first lens unit by making an arrangement such that a value is not higher than the upper limit value is advantageous for securing a zooming function to the second lens unit. Moreover, the first lens unit and the aperture stop are susceptible to come close, and it is advantageous for making small the diameter of the lens.

Moreover, it is desirable that the zoom lens system satisfies the following conditional expression.

$$35°<\tan^{-1}(IH_w/f_w) \qquad (2)$$

where, $f_w$ denotes a focal length of the entire zoom lens system at the wide angle end, and $IH_w$ denotes a maximum image height at a wide angle end.

Conditional expression (2) is an expression which regulates a relationship between the maximum image height and the focal length at the wide angle end, and makes it easy to secure an image angle at the wide angle end. By specifying the focal length and the image height such that a value is not lower than the lower limit value, it becomes easy to secure the image angle. $IH_w$ is determined by an effective image pickup area at the wide angle end.

The effective image pickup area is an area of a photoelectric conversion surface of the image pickup element, in which, an image which is used at the time of recording, display, and printing of an image is formed. The effective image pickup area might be subjected to a change in a size of the area such as a change in an aspect ratio. In such a case, the maximum of the image height which may be achieved in the effective image pickup area is let to be $IH_w$.

Moreover, generally, a shape of the effective image pickup area is rectangular, and a size of the effective image pickup area is constant at the time of zooming from the wide angle end to the telephoto end.

Whereas, a recording and reproducing of an image might be carried out by carrying out image processing in which, a distortion occurring at the wide angle side is corrected. The effective image pickup area in a case of correcting the distortion electrically changes according to a degree of correction by the image processing. For instance, in a case of recording and reproducing an image upon correcting electrically a barrel distortion which occurs at the wide angle end, the shape of the effective image pickup area becomes a barrel shape. $IH_w$ in this case, is the maximum of the image height which might be achieved in the effective image pickup area at the time of wide-angle end taking, similarly as it has been described above.

Moreover, it is desirable to let the third lens unit be fixed with respect to the image pickup element, at the time of zooming. Accordingly, since the number of lens units which move at the time of zooming is decreased, it is advantageous for simplifying the structure. Moreover, when the aperture stop is disposed near the third lens unit, it is advantageous for making small the lens diameter.

Moreover, it is desirable to structure the first lens unit to include in order from the object side thereof, a front lens component having a negative refracting power, a prism having a rear surface as a reflecting surface which reflects an optical path, and a rear lens component having a positive refracting power. Accordingly, it is possible to make a size on the object side to be shorter than the reflecting surface, which is advantageous for making the first lens unit small.

Moreover, by letting the front side lens component have a negative refracting power, it is possible to make the effective diameter small. By letting the optical reflecting element to be a prism, it is possible to make the optical path length to be shorter. Accordingly, it is possible to realize that a position of the entrance pupil shallow (be shortened the distance between the first lens surface and the entrance pupil) Accordingly, it is advantageous to make the size small.

Moreover, at the front lens component in the first lens unit, a height of incidence of light rays at the wide angle end state becomes high. Therefore, by letting the front lens component of the first lens unit to be one negative lens, it is all the more advantageous for making small the size in a direction of thickness and a surface of incidence of the zoom lens system.

When such a structure is made, it is desirable that the negative lens of the front lens component satisfies at least one of the following conditional expressions (3) and (4).

$$1.0<|f_{L1n}/f_w|<3.0 \qquad (3)$$

$$N_{1d}>1.9 \qquad (4)$$

where, $f_{L1n}$ denotes a focal length of the negative lens of the front lens of the front lens component in the first lens unit, $f_w$ denotes a focal length of the overall zoom lens system, at the wide angle end, and $N_{1d}$ denotes a refractive index of the negative lens of the front lens component in the first lens unit, with respect to a d-line.

Conditional expression (3) is an expression for setting appropriately the refracting power of the negative lens of the first lens unit, and is an expression for making it more easy to secure the image angle and a small size of the first lens unit by making an entrance pupil shallow, while securing zooming ratio and optical performance. By suppressing appropriately the refracting power of the negative lens of the first lens unit by making an arrangement such that a value is not lower than the lower limit value in conditional expression (3), it becomes easy to secure a zooming load of a lens unit which is subsequent to the first lens unit, which is advantageous for decreasing an amount of movement of the lens units which move, and securing the zooming ratio of the entire zoom lens system. Moreover, since the negative lens is away from the aperture stop, it is susceptible to an occurrence of an oblique (off axis) aberration. However, by suppressing the refracting power to a moderate level, it is easy to suppress an occurrence of a chromatic aberration and the oblique aberration such as distortion. On the other hand, by securing the refracting power of the negative lens in the first lens unit by making an arrangement such that a value is not higher than the upper limit value in conditional expression (3), a function of making the entrance pupil shallow is secured, which is advantageous for both securing of the image angle, and making small (reducing the size of) each optical element forming the first lens unit.

Conditional expression (4) is an expression for setting the refracting power of the negative lens in the first lens unit, with respect to d-line, and is an expression for making it even more advantageous for having both the small size (compactness of size) and favorable performance. When the image angle is widened, normally, for securing the optical performance, an image surface of the negative lens nearest to the object side is susceptible to be a strong concave surface. In this case, the negative lens is susceptible to be projected toward the object side, and the first lens unit is susceptible to become large. By making an arrangement such that a value is not lower than the lower limit value in conditional expression (4), it is possible to suppress easily a curvature of a lens surface while securing the negative refracting power of the negative lens. Accordingly, an optical axial distance between the negative lens and the reflecting optical member is decreased, and it is possible to have both the small size of the first lens unit (more particularly, thinning of the image pickup apparatus) and securing of the optical performance.

Moreover, it is preferable to form the rear lens component of the first lens unit by one positive lens. Accordingly, with a range of movement of the second lens unit secured, it becomes easy to bring the first lens unit closer to the aperture stop, which is advantageous for making the size small.

In this case, it is preferable that the following conditional expression (5) is satisfied.

$$1.2 < |f_T/f_{L1p}| < 2.0 \quad (5)$$

where, $f_T$ denotes a focal length of the entire zoom lens system at a telephoto end, and $f_{L1p}$ denotes a focal length of the positive lens of the rear lens component in the first lens unit.

Conditional expression (5) is an expression which regulates appropriately the refracting power of the positive lens in the first lens unit. For making the size small, it is preferable to secure the refracting power of the first lens unit and to impart a zooming function to the second lens unit, by making an arrangement such that a value is not lower than the lower limit value in conditional expression (5). By suppressing the refracting power of the positive lens to a moderate level by making an arrangement such that a value is not higher than the upper limit value, it is easy to suppress a difference in coma aberration according to wavelength which occurs in the positive lens, and to suppress a color spreading.

Moreover, regarding the second lens unit, it is desirable to satisfy conditional expression (6).

$$0.8 < |f_2/f_w| < 2.0 \quad (6)$$

where, $f_2$ denotes a focal length of the second lens unit, and $f_w$ denotes a focal length of the entire zoom lens system at a wide angle end.

Conditional expression (6) is an expression which regulates appropriately the refracting power of the second lens unit. By making an arrangement such that a value is not lower than the lower limit value in conditional expression (6), it becomes easy to suppress the negative refracting power of the second lens unit, and to suppress an occurrence of distortion and astigmatism at the second lens unit. By securing the negative refracting power of the second lens unit to a moderate level by making an arrangement such that a value is not higher than the upper limit value in conditional expression (6), it is advantageous for compressing the overall length while securing the zooming load of the second lens unit.

Moreover, an arrangement may be such that a fifth lens unit is disposed at an image side of the fourth lens unit. Accordingly, it is preferable as a control of light becomes easier.

By letting the fifth lens unit to be a positive lens unit having a positive refracting power, it becomes easy to separate the entrance pupil from the image surface. Accordingly, it becomes easy to suppress a deterioration of image in a surrounding portion, which is susceptible to occur when an angle of incidence which is favorable in the image pickup element, is small.

On the other hand, letting the fifth lens unit to be a negative lens unit having a negative refracting power is advantageous for correction of the oblique aberration.

Moreover, making an arrangement such that the fifth lens unit has at least one aspheric surface is advantageous for correction of distortion and image plane curvature.

Moreover, the fifth lens unit maybe let to be a unit which moves at the time of focusing.

Moreover, it is preferable to make an arrangement such that, a distance between the aperture stop and the third lens unit at the time of zooming is constant, and in the telephoto end state as compared to the wide angle end state, the second lens unit is positioned at the image side, the fourth lens unit is positioned at the object side, a distance between the first lens unit and the second lens unit increases, a distance between the second lens unit and the third lens unit decreases, a distance between the third lens unit and the fourth lens unit decreases, and a distance between the fourth lens unit and the fifth lens unit increases.

When such an arrangement is made, it is easy to make the third lens unit small while carrying out the main zooming by moving the second lens unit and the fourth lens unit. Moreover, it is possible to make small an amount of movement of the fifth lens unit at the time of zooming. Or, since it is possible to let it to be fixed at the time of zooming, it is all the more advantageous for simplifying the structure.

When the zoom lens system has a focusing function, each value used in each of the abovementioned conditional expressions is let to be a value when focused to a farthest object point.

Based on the basic structure described above, for each arrangement and conditional expression described above, when a plurality of conditional expressions are allowed to be satisfied simultaneously, it is more preferable from a point of view of making the size small, securing of zooming ratio, securing of an image angle, and securing of the optical performance etc.

For example, another basic structure of the image pickup apparatus having an optical path reflecting zoom lens system includes a zoom lens system, and an image pickup element which is disposed at an image side of the zoom lens system, and which changes an image (formed) by the zoom lens system, to an electric signal.

An arrangement can be made to be such that, the zoom lens system includes in order from an object side thereof, a first lens unit having a positive refracting power, which includes a reflecting optical member having a reflecting surface which reflects an optical path, a second lens unit having a negative refracting power, a third lens unit having a positive refracting power, a fourth lens unit having a positive refracting power, a fifth lens unit having a positive refracting power, and an aperture stop which is disposed between the second lens unit and the fourth lens unit, and the first lens unit has a position fixed with respect to a position of the image pickup element, and at least the second lens unit and the fourth lens unit are moved, and the zooming is carried out from a wide angle end to a telephoto end by changing a distance between the each of lens units, and (the zoom lens system) satisfies the following conditional expressions.

$$2.0 < f_1/f_w < 5.0 \quad (1), \text{and}$$

$$35° < \tan^{-1}(IH_w/f_w) \quad (2)$$

where, $f_1$ denotes a focal length of the first lens unit, $f_w$ denotes a focal length of the entire zoom lens system, at a wide angle end, and $IH_w$ denotes a maximum image height at a wide angle end.

Moreover, the second lens unit may be structured to include in order from an object side thereof, a negative lens, and a cemented lens of a positive lens and a negative lens.

Moreover, it is more preferable to have the following arrangement in each of the abovementioned conditional expressions.

It is preferable to let a lower limit value in the conditional expression (1) to be 2.7, and a lower limit value of 2.9 is more preferable.

It is preferable to let an upper limit value in conditional expression (1) to be 4.6, and an upper limit value of 4.3 is more preferable.

It is preferable to let a lower limit value in conditional expression (2) to be 36°, and a lower limit value of 37° is more preferable.

It is preferable to provide an upper limit value in conditional expression (2), and it is preferable that the upper limit value is not higher than 45°, and an upper limit value not higher than 40° is more preferable. This is advantageous for suppressing the occurrence of the extreme distortion, while maintaining the small size of the zoom lens system.

It is preferable to let a lower limit value in conditional expression (3) to be 1.5, and a lower limit value of 2.0 is more preferable.

It is preferable to let an upper limit value in conditional expression (3) to be 2.7, and an upper limit value of 2.5 is more preferable.

It is preferable to let a lower limit value in conditional expression (4) to be 1.95, and a lower limit value of 2.0 is more preferable.

It is preferable to provide an upper limit value in conditional expression (4), and it is preferable that the upper limit value is not higher than 2.3, and an upper limit value not higher than 2.2 is more preferable. This is advantageous for reducing a material cost.

It is preferable to let a lower limit value in conditional expression (5) to be 1.3, and a lower limit value of 1.4 is more preferable.

It is preferable to let an upper limit value in conditional expression (5) to be 1.9, and an upper limit value of 1.85 is more preferable.

It is preferable to let a lower limit value in conditional expression (6) to be 1.0, and a lower limit value of 1.2 is more preferable.

It is preferable to let an upper limit value in conditional expression (6) to be 1.8, and an upper limit value of 1.6 is more preferable.

It is preferable that each (aspect of the) invention described above satisfies arbitrarily, a plurality of conditional expressions simultaneously. Moreover, regarding each conditional expression, only an upper limit value and a lower limit value in a range of numerical values of the further restricted conditional expressions may be restricted. Moreover, various structures described above may be combined arbitrarily.

The exemplary embodiments of an image pickup apparatus according to the present invention will be described below in detail by referring to the accompanying diagrams. However, the present invention is not restricted to the embodiments described below.

EMBODIMENT

The embodiments described below are examples of an image pickup apparatus having an optical path reflecting zoom lens system, which is advantageous for water proofing and dust proofing, without the lens system to be drawn out (protruded out) at the time of start-up of the image pickup apparatus. Embodiments from a first embodiment to a fifth embodiment are embodiments of an image pickup apparatus with a zoom lens system having a zooming ratio of about 3.5, a half-image angle at a wide angle end of 40° and more, and having a high performance which can also be used as an optical system for an image pickup element of a latest small pixel pitch, and which is a thin wide angle zoom lens system with a superior compactness.

Moreover, in the embodiments from the first embodiment to the fifth embodiment, an effective image pickup area in a full-zoom state is rectangular and constant.

A reflecting surface is disposed such that a short side direction of the effective image pickup area is a direction of thickness of the zoom lens system.

Although a position of a rear surface as a reflecting surface has been omitted in lens data, the reflecting surface is positioned between a third surface and a fourth surface, and the reflecting plane surface is tilted 45° with respect to an optical axis to allow the optical axis to be reflected by 90°. Moreover, the reflecting optical member is let to be a rectangular prism in all the embodiments. As a matter of course, the reflecting optical member may be a front surface mirror or a reflecting curved surface, and may be an object of which, a shape of a reflecting surface changes. Moreover, an arrangement may be made such that, a surface of incidence and a surface of emergence are imparted a refracting power.

Moreover, corresponding values in conditional expressions for each zoom lens system are values when focused to an infinite object point.

The overall length is a length in which, a back focus is added to an optical axial distance from a surface of incidence to a surface of emergence of a lens. The back focus is indicated by an air-conversion length.

Moreover, embodiments from a sixth embodiment to a tenth embodiment, are examples in which, zoom lens systems in image pickup apparatuses of the first embodiment to the fifth embodiments respectively are used, and image pickup apparatuses which correct the distortion electrically are used, and in which, a shape of the effective image pickup area changes. Therefore, the embodiments from the sixth embodiment to the tenth embodiment differ from embodiments in which the image height and the image angle in a zooming state correspond.

It is an image pickup apparatus having a zoom lens system in which, a half-image angle ω at the wide angle end is 38° or more.

In the embodiments from the sixth embodiment to the tenth embodiment, a recording and display of an image is carried out upon correcting electrically a barrel distortion occurring at the wide-angle side and a pin-cushion distortion occurring at a telephoto side.

Figure 11A:
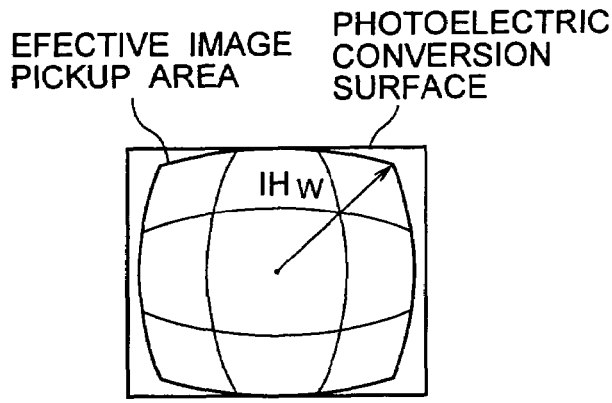
FIG. 11A to FIG. 11F are diagrams describing a concept of correction of a distortion.
Figure 11B:
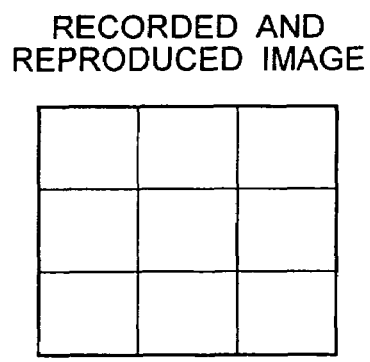
Figure 11C:
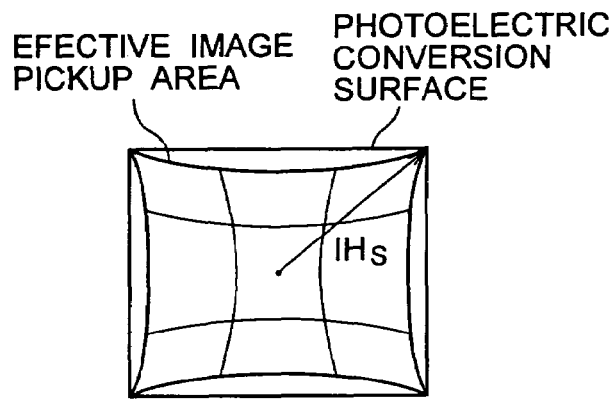
Figure 11D:
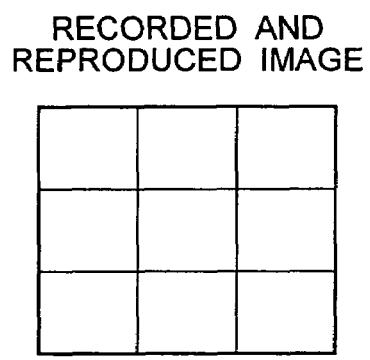
Figure 11E:
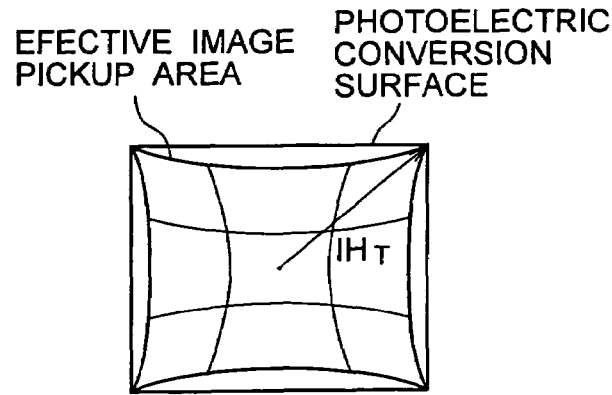

Firstly, the distortion correction will be described conceptually by referring to FIG. 11A to FIG. 11F. FIG. 11A is a diagram showing a relationship of a distorted state of an image and a photoelectric conversion surface near the wide angle end, and the effective image pickup area. FIG. 11C is a diagram showing a relationship of a distorted state of an image and a photoelectric conversion surface near an intermediate focal length, and the effective image pickup area. FIG. 11E is a diagram showing a relationship of a distorted state of an image and a photoelectric conversion surface near the telephoto end, and the effective image pickup area.

In the zoom lens system of the present invention, a barrel distortion as in FIG. 11A, occurs at the wide angle end on a rectangular photoelectric conversion surface. Whereas, near the intermediate focal length state and at the telephoto end, a pin-cushion distortion as in FIG. 11C and FIG. 11E occurs. The diagrams are drawn exaggerating the distorted state for purpose of illustration.

Figure 11F:
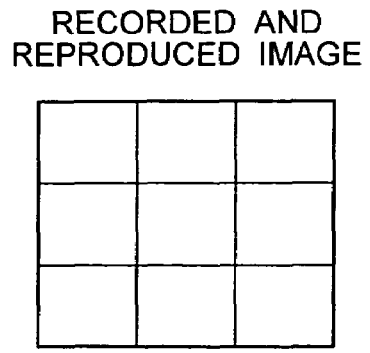

For correcting electrically the distortion, an arrangement is made such that, the effective image pickup area has the barrel shape at the wide angle end, and the pin-cushion shape at the intermediate focal length state and the telephoto end. Moreover, the effective image pickup area which is set in advance is subjected to image conversion by image processing, and is converted to image information of a rectangular shape in which, the distortion is reduced. FIG. 11B, FIG. 11D, and FIG. 11F show rectangular shaped image information in which the distortion is reduced at the wide angle end, the intermediate focal length state, and the telephoto end respectively.

An arrangement is made such that the maximum image height $IH_w$ at the wide angle end is smaller than the maximum image height $IH_s$ in the intermediate focal length state, and the maximum image height $IH_t$ at the telephoto end. In an example in FIG. 11A, an arrangement is made such that, a length in a direction of a short side of the photoelectric conversion surface at the wide angle end is same as a length in a direction of a short side of the effective image pickup area. However, an arrangement may be made to record and reproduce an image which is converted to a rectangular shape with a barrel-shaped area smaller than this as the effective image pickup area. An arrangement is made such that an image height in the embodiments from the sixth embodiment to the tenth embodiment is such that, the length in the direction of the short side of the photoelectric conversion surface at the wide angle end becomes the same as the length in the direction of the short side of the effective image pickup area, and is let to be an image height and image angle when the distortion is completely corrected electrically.

A zoom lens system in the image pickup apparatus according to the embodiments from the first embodiment to the fifth embodiment of the present invention will be described below. Lens cross-sectional surface at the wide angle end (FIG. 1A, FIG. 2A, FIG. 3A, FIG. 4A, and FIG. 5A), at the intermediate focal length state (FIG. 1B, FIG. 2B, FIG. 3B, FIG. 4B, and FIG. 5B), and at the telephoto end (FIG. 1C, FIG. 2C, FIG. 3C, FIG. 4C, and FIG. 5C) respectively at the time of infinite object point focusing of the embodiments from the first embodiment to the fifth embodiment are shown in FIG. 1A to FIG. 5C. In FIG. 1A to FIG. 5C, G1 denotes a first lens unit, G2 denotes a second lens unit, S denotes an aperture stop, G3 denotes a third lens unit, G4 denotes a fourth lens unit, G5 denotes a fifth lens unit, F denotes a parallel flat plate which forms a low pass filter in which, a wavelength region restricting coating which restricts infrared light is applied, C denotes a parallel flat plate of carbon glass of an electronic image pickup element, and I denotes an image plane. A multilayered film for restricting a wavelength region may be applied to a surface of the carbon glass C. Moreover, the carbon glass may be let to have an effect of a low pass filter.

Moreover, in each embodiment, the aperture stop S is fixed integrally to the third lens unit. Each numerical data is data in a state when focused at an infinite object. A unit of length for each value is mm, and a unit of angle is degrees (°). In each embodiment, a rectangular prism which does not have a power is used as the reflecting optical member. Moreover, focusing is carried out by moving the fifth lens unit. In the first embodiment to the fourth embodiment, the fifth lens unit is moved by a focusing operation from an object point at a long distance to an object point at a short distance, and in the fifth embodiment, the focusing is carried out by moving the fifth lens unit toward an image side by the focusing operation from the long-distance object point to the short-distance object point. Further, zoom data are values at a wide angle end (WE), at an intermediate zooming (focal length) state (ST), and at a telephoto end (TE).

Figure 1B:
Figure 1B:
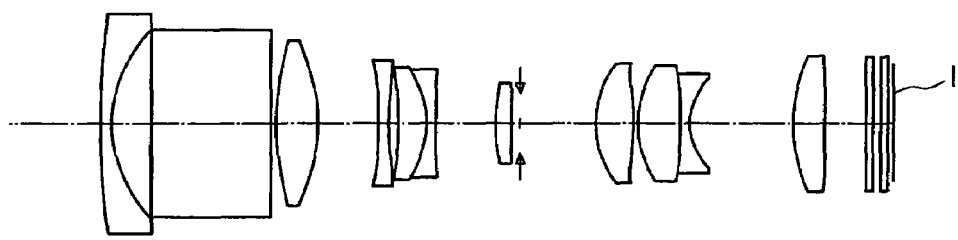
Figure 1C:
Figure 1C:
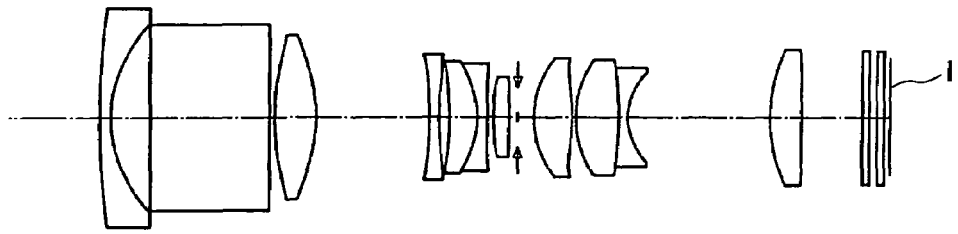

A zoom lens system in the first embodiment, as shown in FIG. 1A to FIG. 1C, includes, in order from an object side thereof, a first lens unit G1 having a positive refracting power, a second lens unit G2 having a negative refracting power, an aperture stop S, a third lens unit G3 having a positive refracting power, a fourth lens unit G4 having a positive refracting power, and a fifth lens unit G5 having a positive refracting power.

At the time of zooming from the wide angle end to the telephoto end, the first lens unit G1 is fixed, the second lens unit G2 moves toward an image side, the third lens unit G3 is fixed, the fourth lens unit G4 moves toward the object side, and the fifth lens unit G5 moves in a convex locus toward the image side. Moreover, the aperture stop S is fixed, and an amount of light is adjusted by changing an aperture size.

In order from the object side, the first lens unit G1 includes a negative meniscus lens having a convex surface directed toward the object side, an optical path bending prism P, and a biconvex positive lens. The second lens unit G2 includes a biconcave negative lens, and a cemented lens of a positive meniscus lens having a convex surface directed toward the image side and a biconcave negative lens. The third lens unit G3 includes a biconvex positive lens. The fourth lens unit G4 includes a biconvex positive lens, and a cemented lens of a biconvex positive lens and a biconcave negative lens. The fifth lens unit G5 includes a biconvex positive lens.

An aspheric surface is used for eight surfaces namely, both surfaces of the biconvex positive lens in the first lens unit G1, both surfaces of the biconcave negative lens in the second lens unit G2, both surfaces of the biconvex positive lens in the third lens unit G3, both surfaces of the biconvex positive lens, on the object side, of the fourth lens unit G4.

Figure 2A:
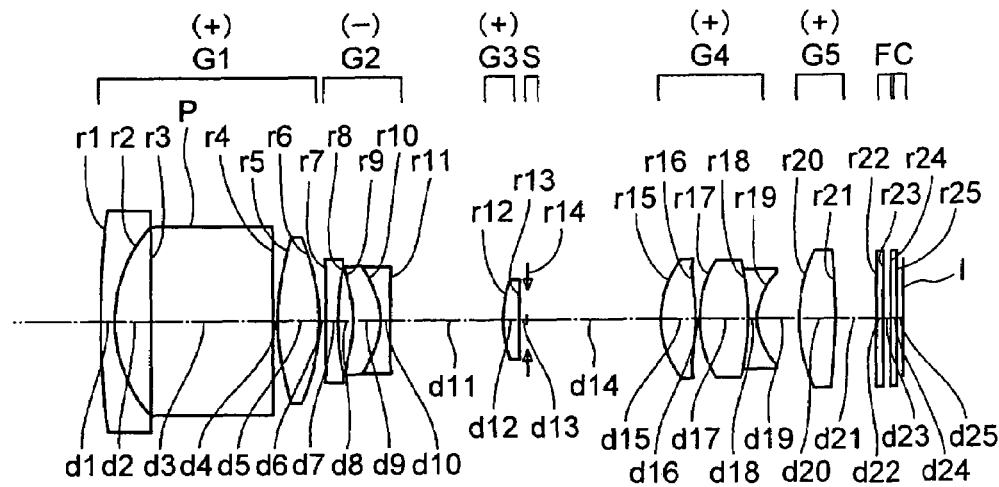
FIG. 2A, FIG. 2B, and FIG. 2C are diagrams similar to FIG. 1A, FIG. 1B, and FIG. 1C respectively, of a zoom lens system in an image pickup apparatus according to a second embodiment of the present invention.
Figure 2B:
Figure 2B:
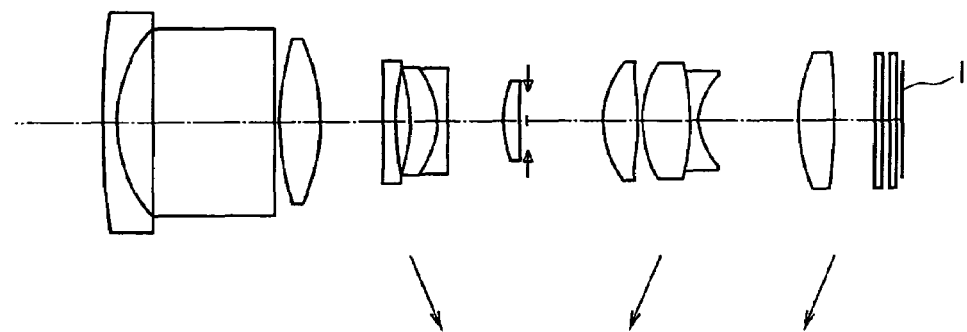
Figure 2C:
Figure 2C:
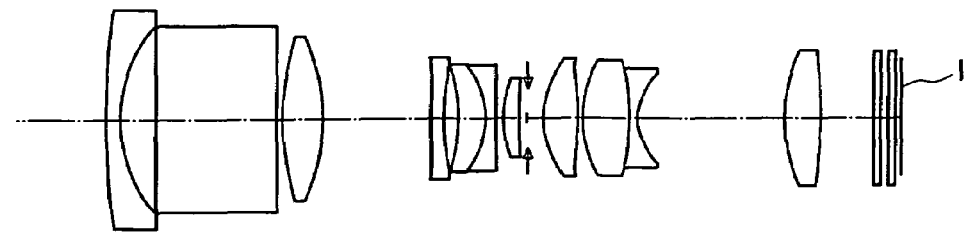

A zoom lens system in the second embodiment, as shown in FIG. 2A to FIG. 2C includes, in order from the object side thereof, a first lens unit G1 having a positive refracting power, a second lens unit G2 having a negative refracting power, an aperture stop S, a third lens unit G3 having a positive refracting power, a fourth lens unit G4 having a positive refracting power, and a fifth lens unit G5 having a positive refracting power.

At the time of zooming from the wide angle end to the telephoto end, the first lens unit G1 is fixed, the second lens unit G2 moves toward the image side, the third lens unit G3 is fixed, the fourth lens unit G4 moves toward the object side, and the fifth lens unit G5 moves in a convex locus toward the image side. Moreover, the aperture stop S is fixed, and an amount of light is adjusted by changing an aperture size.

In order from the object side, the first lens unit G1 includes a negative meniscus lens having a convex surface directed toward the object side, an optical path bending prism P, and a biconvex positive lens. The second lens unit G2 includes a biconcave negative lens, and a cemented lens of a positive meniscus lens having a convex surface directed toward the image side and a biconcave negative lens. The third lens unit G3 includes a positive meniscus lens having a convex surface directed toward the object side. The fourth lens unit G4 includes a biconvex positive lens and a cemented lens of a biconvex positive lens and a biconcave negative lens. The fifth lens unit G5 includes a biconvex positive lens.

An aspheric surface is used for eight surfaces namely, both surfaces of the biconvex positive lens in the first lens unit G1, both surfaces of the biconcave negative lens in the second lens unit G2, both surfaces of the positive meniscus lens in the third lens unit G3, and both surfaces of the biconvex positive lens on the object side of the fourth lens unit G4.

Figure 3A:
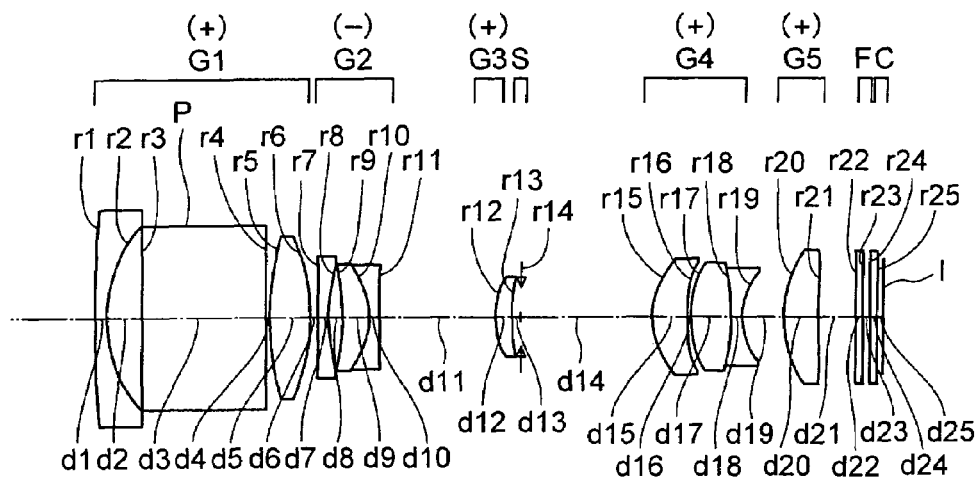
FIG. 3A, FIG. 3B, and FIG. 3C are diagrams similar to FIG. 1A, FIG. 1B, and FIG. 1C respectively, of a zoom lens system in an image pickup apparatus according to a third embodiment of the present invention.
Figure 3B:
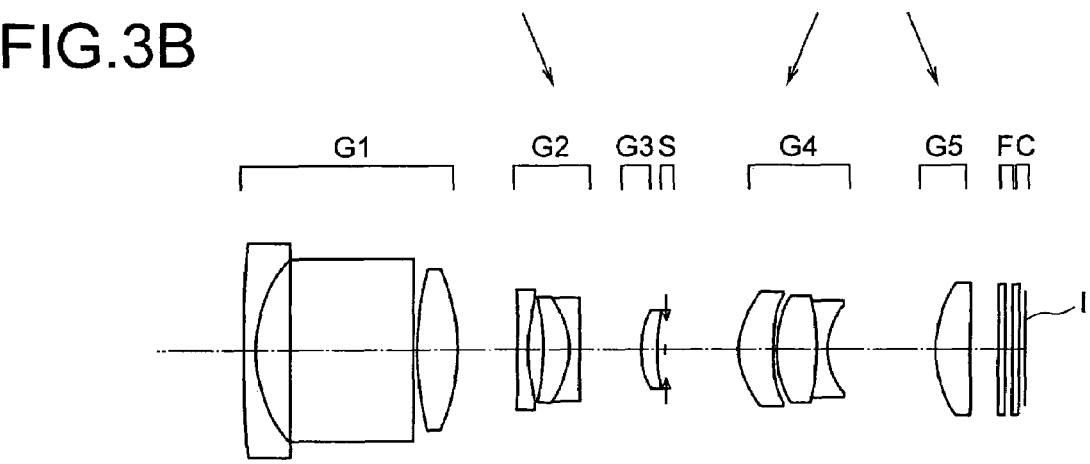
Figure 3C:
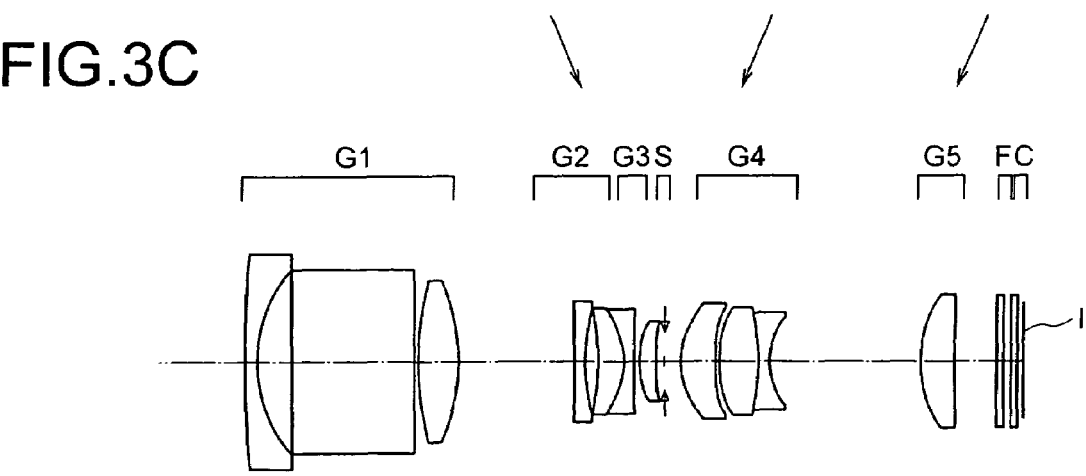

A zoom lens system in the third embodiment, as shown in FIG. 3A to FIG. 3C includes, in order from the object side thereof, a first lens unit G1 having a positive refracting power, a second lens unit G2 having a negative refracting power, an aperture stop S, a third lens unit G3 having a positive refracting power, a fourth lens unit G4 having a positive refracting power, and a fifth lens unit G5 having a positive refracting power.

At the time of zooming from the wide angle end to the telephoto end, the first lens unit G1 is fixed, the second lens unit G2 moves toward the image side, the third lens unit G3 is fixed, the fourth lens unit G4 moves toward the object side, and the fifth lens unit G5 moves in a convex locus toward the image side. Moreover, the aperture stop S is fixed, and an amount of light is adjusted by changing an aperture size.

In order from the object side, the first lens unit G1 includes a negative meniscus lens having a convex surfaced directed toward the object side, an optical path bending prism P, and a biconvex positive lens. The second lens unit G2 includes a biconcave negative lens and a cemented lens of a positive meniscus lens having a convex surface directed toward the image side and a negative meniscus lens having a convex surface directed toward the image side. The third lens unit G3 includes a positive meniscus lens having a convex surface directed toward the object side. The fourth lens unit G4 includes a positive meniscus lens having a convex surface directed toward the object side, and a cemented lens of biconvex positive lens and a biconcave negative lens. The fifth lens unit G5 includes a positive meniscus lens having a convex surface directed toward the object side.

An aspheric surface is used for seven surfaces namely, both surfaces of the biconvex positive lens in the first lens unit G1, a surface on the object side of the biconcave negative lens in the second lens unit G2, both surfaces of the positive meniscus lens in the third lens unit G3, and both surfaces of the positive meniscus lens in the fourth lens unit G4.

Figure 4A:
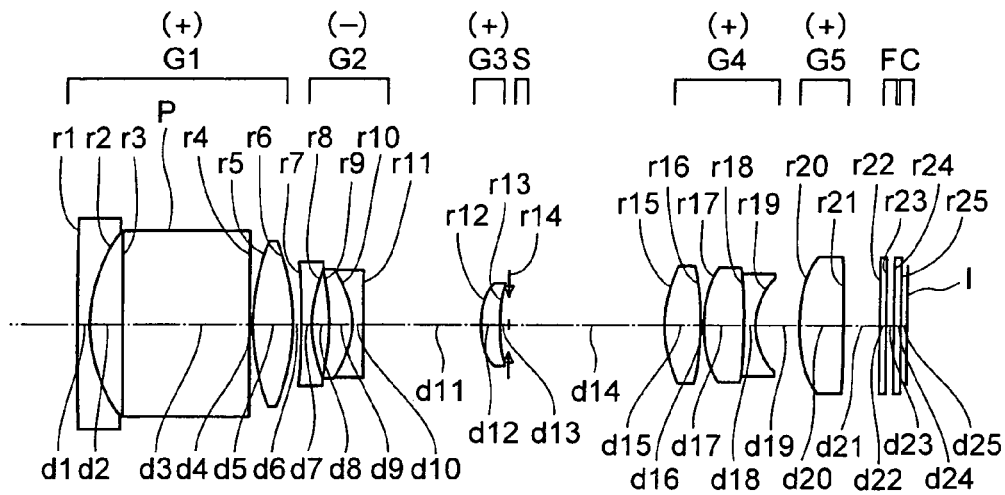
FIG. 4A, FIG. 4B, and FIG. 4C are diagrams similar to FIG. 1A, FIG. 1B, and FIG. 1C respectively, of a zoom lens system in an image pickup apparatus according to a fourth embodiment of the present invention.
Figure 4B:
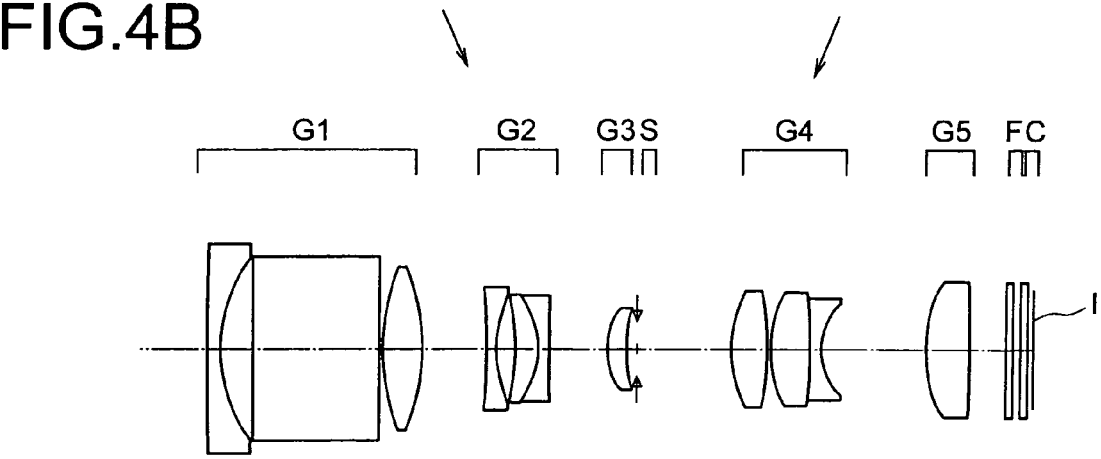
Figure 4C:
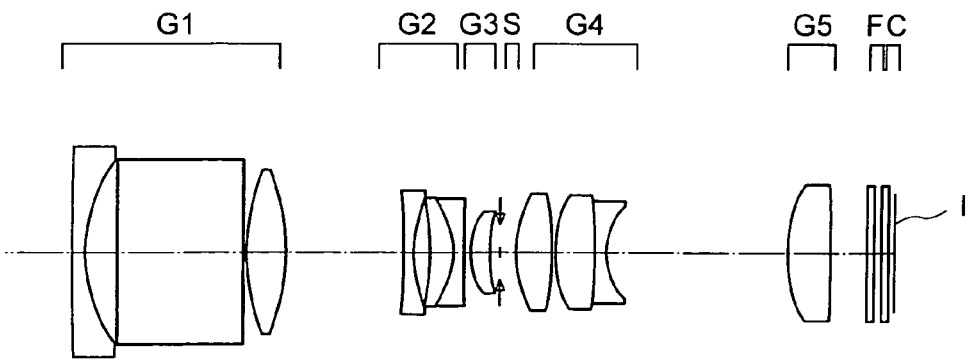

A zoom lens system in the fourth embodiment, as shown in FIG. 4A to FIG. 4C includes, in order from the object side thereof, a first lens unit G1 having a positive refracting power, a second lens unit G2 having a negative refracting power, an aperture stop S, a third lens unit G3 having a positive refracting power, a fourth lens unit G4 having a positive refracting power, and a fifth lens unit G5 having a positive refracting power.

At the time of zooming from the wide angle end to the telephoto end, the first lens unit G1 is fixed, the second lens unit G2 moves toward the image side, the third lens unit G3 is fixed, the fourth lens unit G4 moves toward the object side, and the fifth lens unit G5 is fixed. Moreover, the aperture stop S is fixed, and an amount of light is adjusted by changing an aperture size.

In order from the object side, the first lens unit G1 includes a planoconcave negative lens, an optical path bending prism P, and a biconvex positive lens. The second lens unit G2 includes a biconcave negative lens, and a cemented lens of a positive meniscus lens having a convex surface directed toward the image side, and a biconcave negative lens. The third lens unit G3 includes a positive meniscus lens having a convex surface directed toward the object side. The fourth lens unit G4 includes a biconvex positive lens and a cemented lens of a biconvex positive lens and a biconcave negative lens. Fifth lens unit G5 includes a biconvex positive lens.

An aspheric surface is used for seven surfaces namely, both surfaces of the biconvex positive lens in the first lens unit G1, both surfaces of the positive meniscus lens in the third lens unit G3, both surfaces of the biconvex positive lens on the object side in the fourth lens unit G4, and a surface on the object side of the biconvex positive lens of the fifth lens unit G5.

Figure 5A:
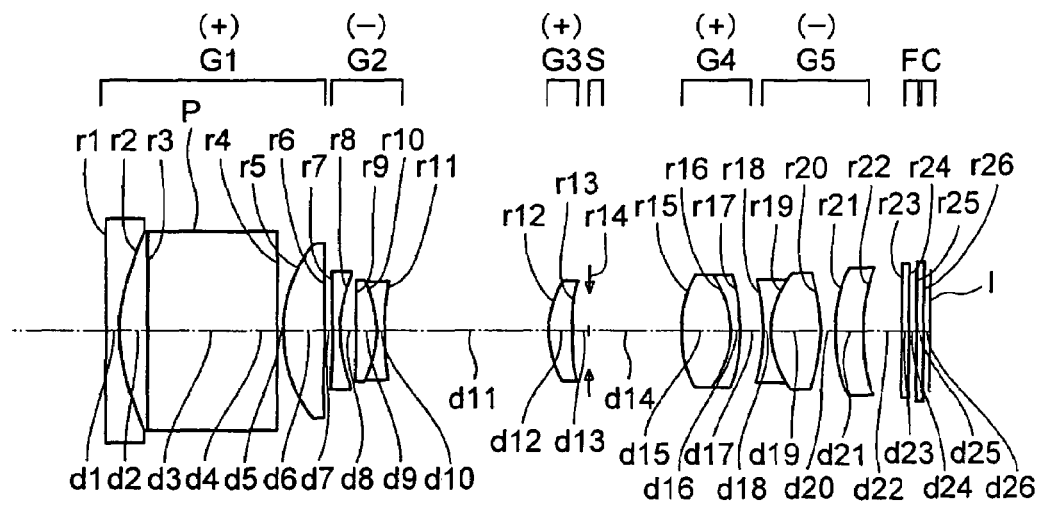
FIG. 5A, FIG. 5B, and FIG. 5C are diagrams similar to FIG. 1A, FIG. 1B, and FIG. 1C respectively, of a zoom lens system in an image pickup apparatus according to a fifth embodiment of the present invention.
Figure 5B:
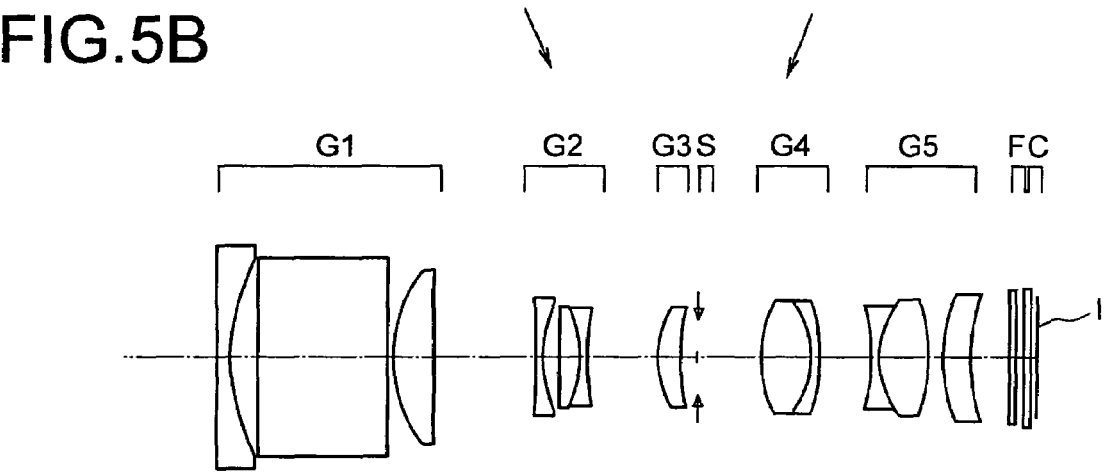
Figure 5C:
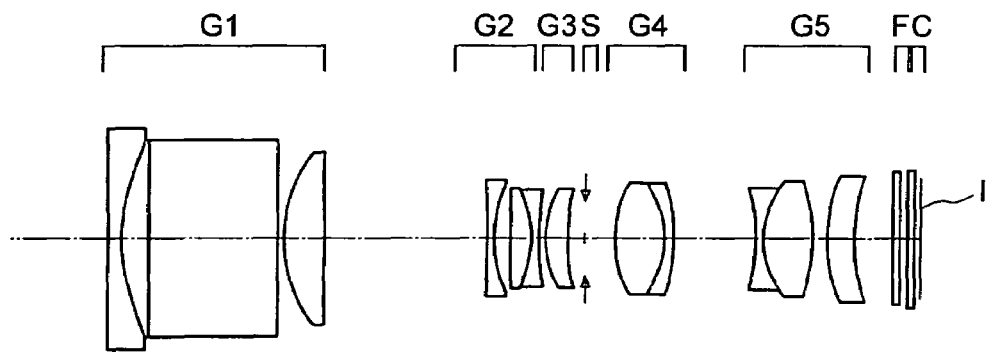
Figure 6A:
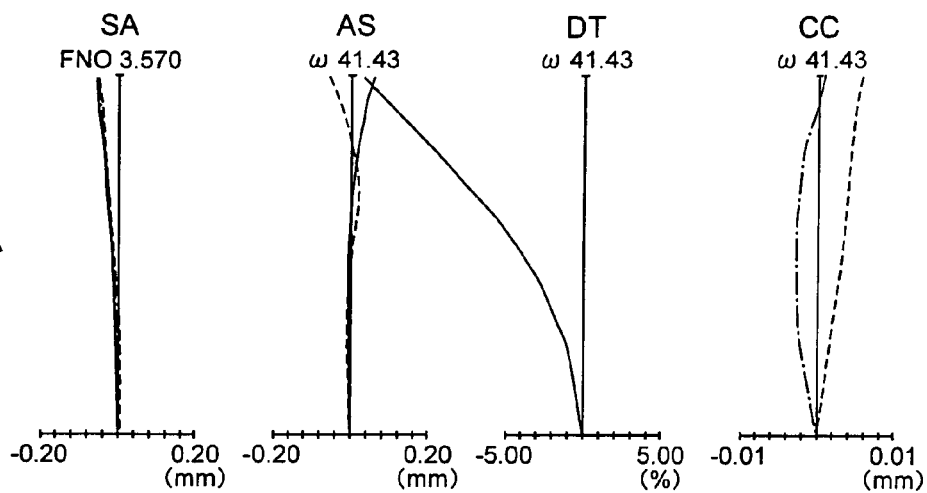
FIG. 6A, FIG. 6B, and FIG. 6C are aberration diagrams at the time of infinite object point focusing in the first embodiment.
Figure 6B:
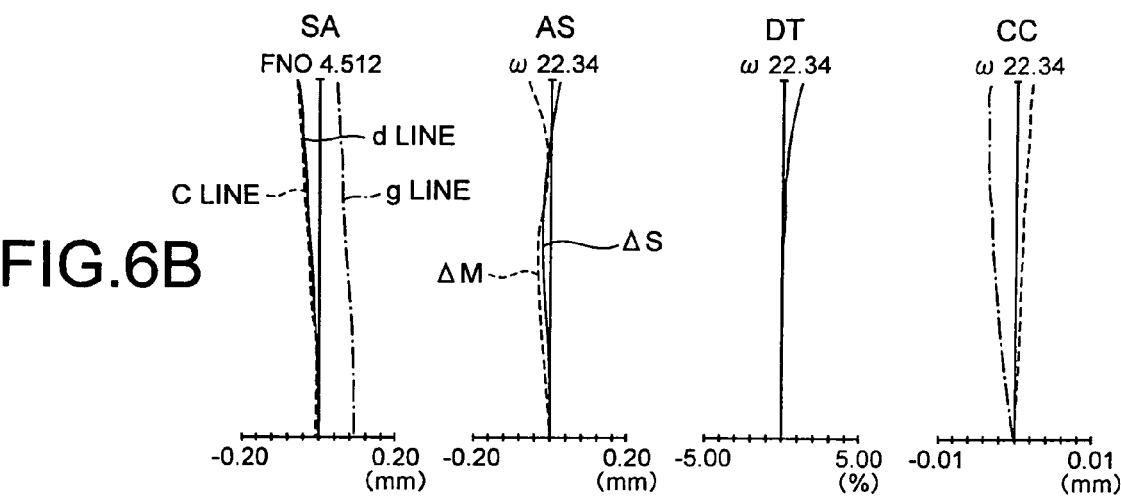
Figure 6C:
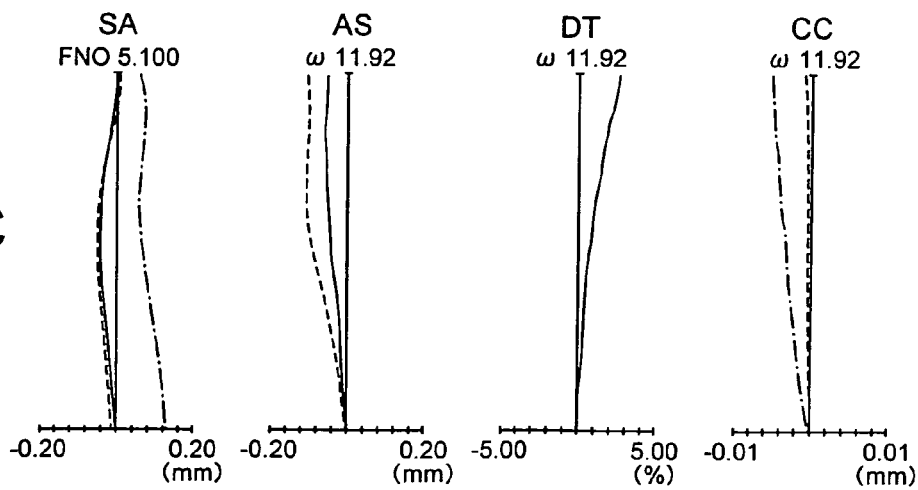
Figure 7A:
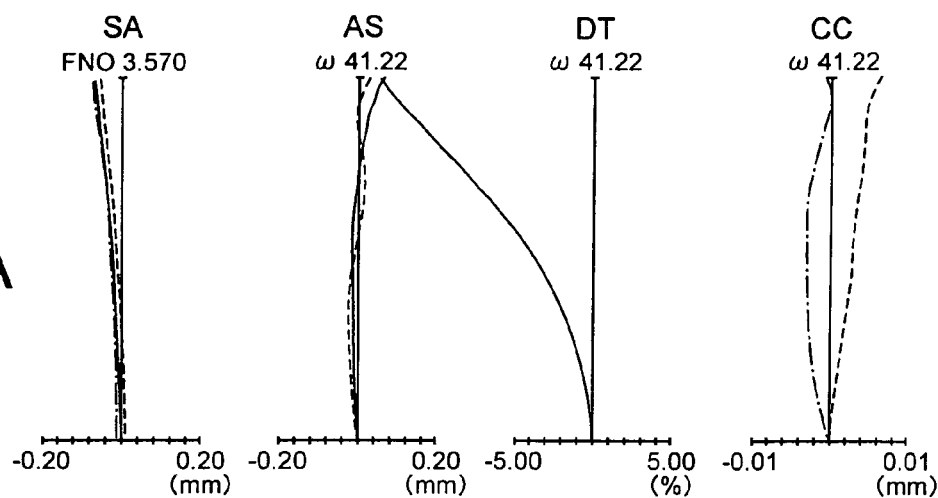
FIG. 7A, FIG. 7B, and FIG. 7C are aberration diagrams at the time of infinite object point focusing in the second embodiment.
Figure 7B:
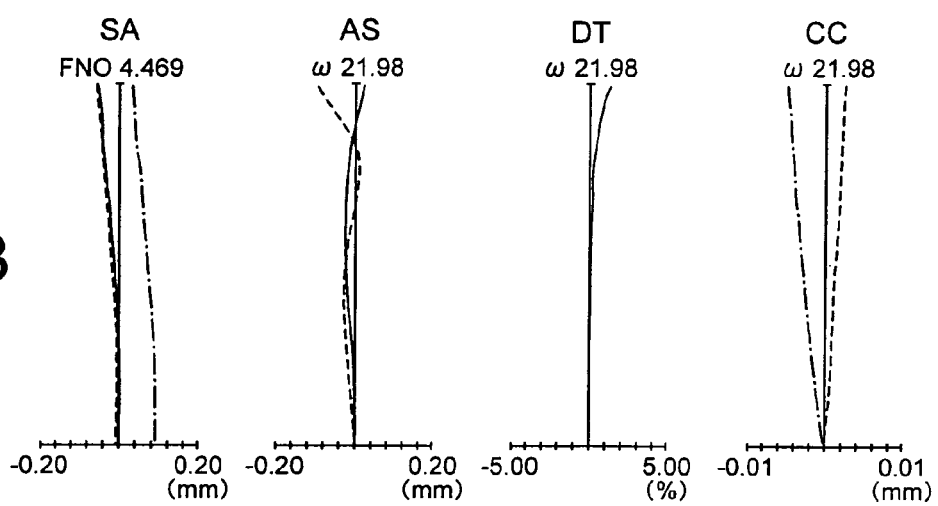
Figure 7C:
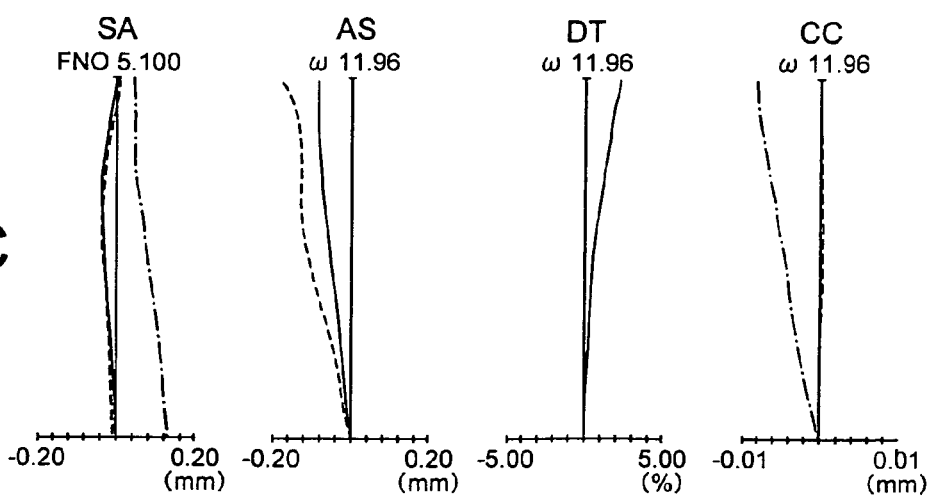
Figure 8A:
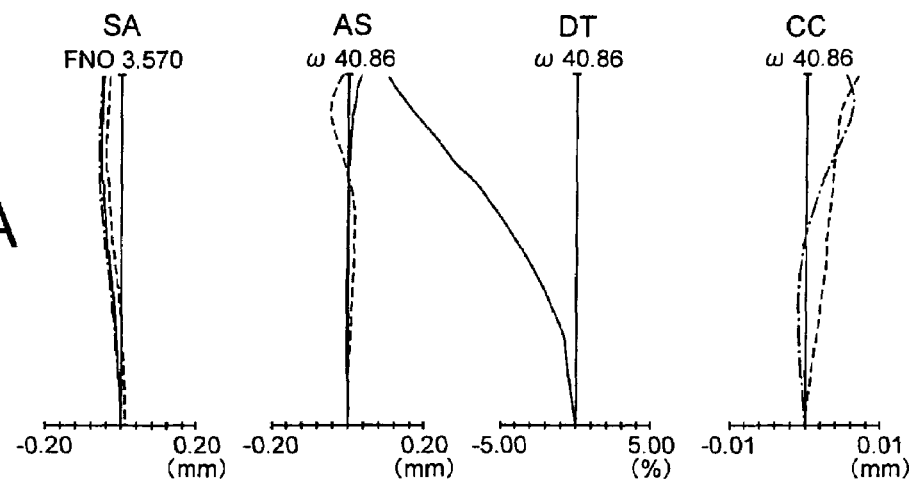
FIG. 8A, FIG. 8B, and FIG. 8C are aberration diagrams at the time of infinite object point focusing in the third embodiment.
Figure 8B:
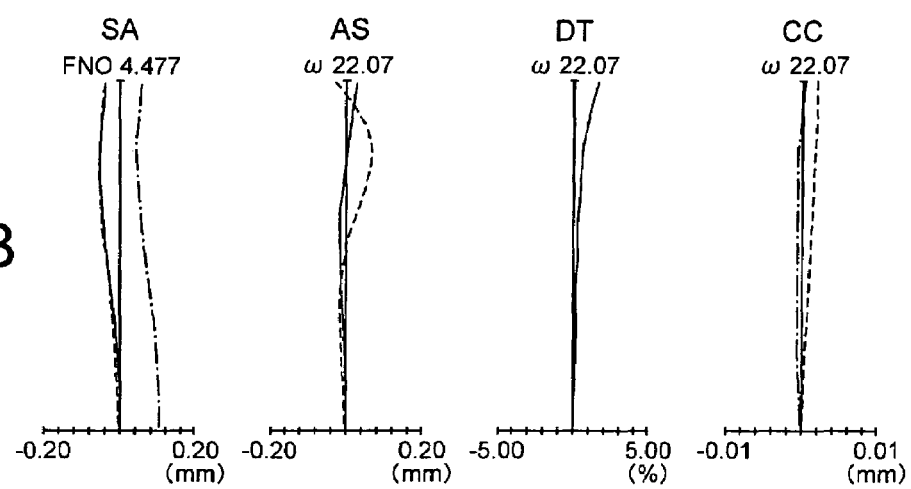
Figure 8C:
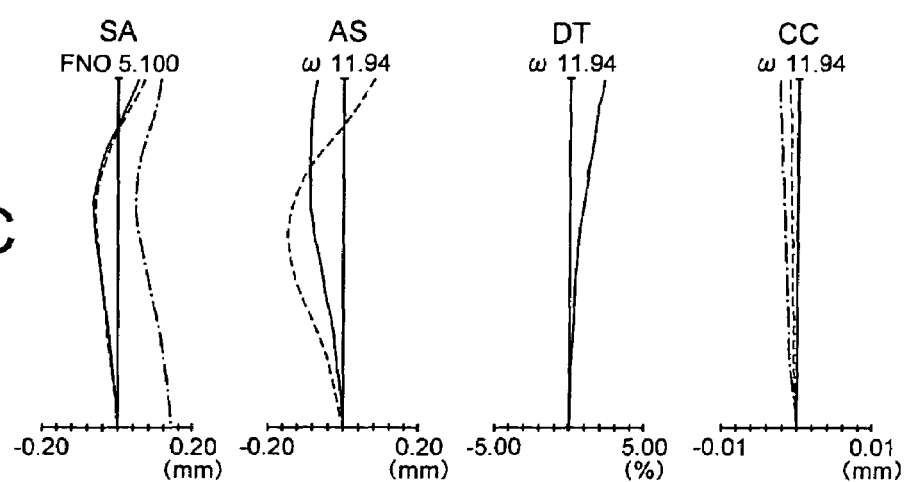
Figure 9A:
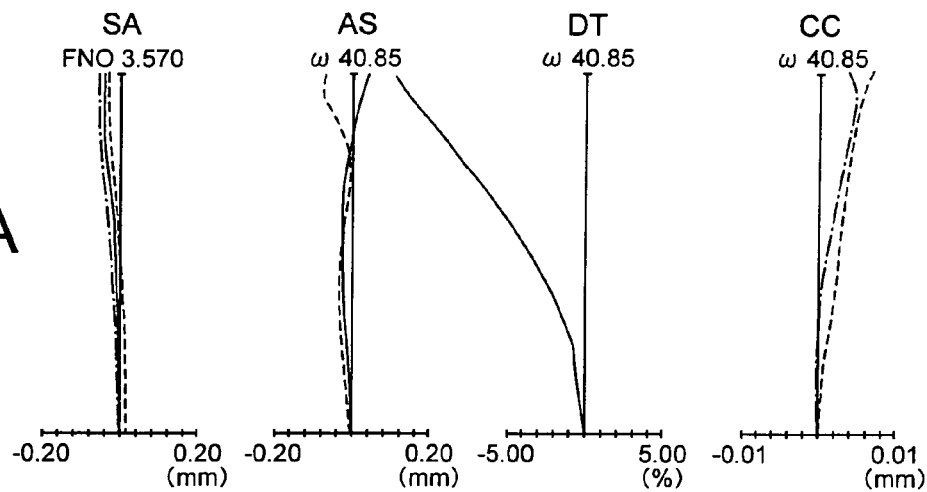
FIG. 9A, FIG. 9B, and FIG. 9C are aberration diagrams at the time of infinite object point focusing in the fourth embodiment.
Figure 9B:
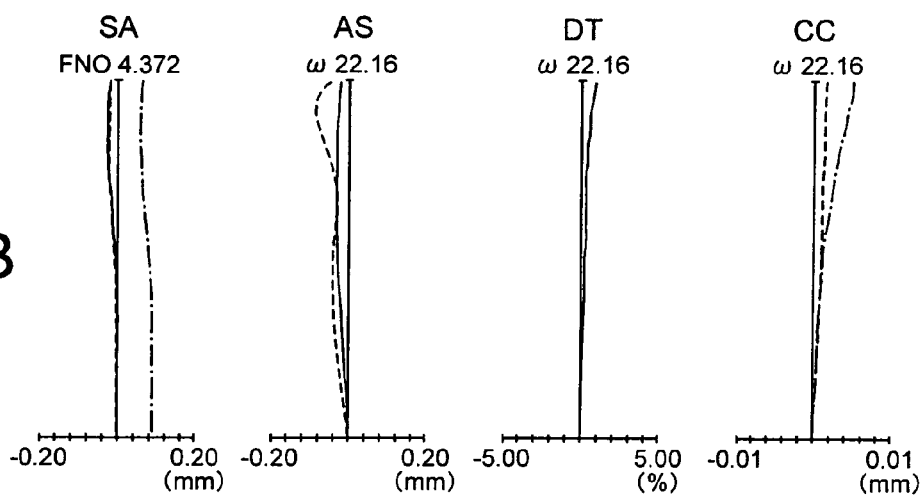
Figure 9C:
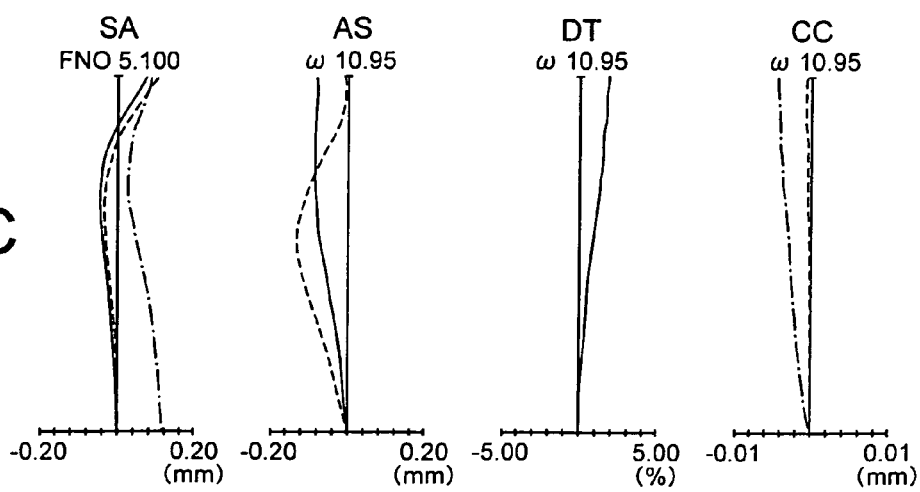
Figure 10A:
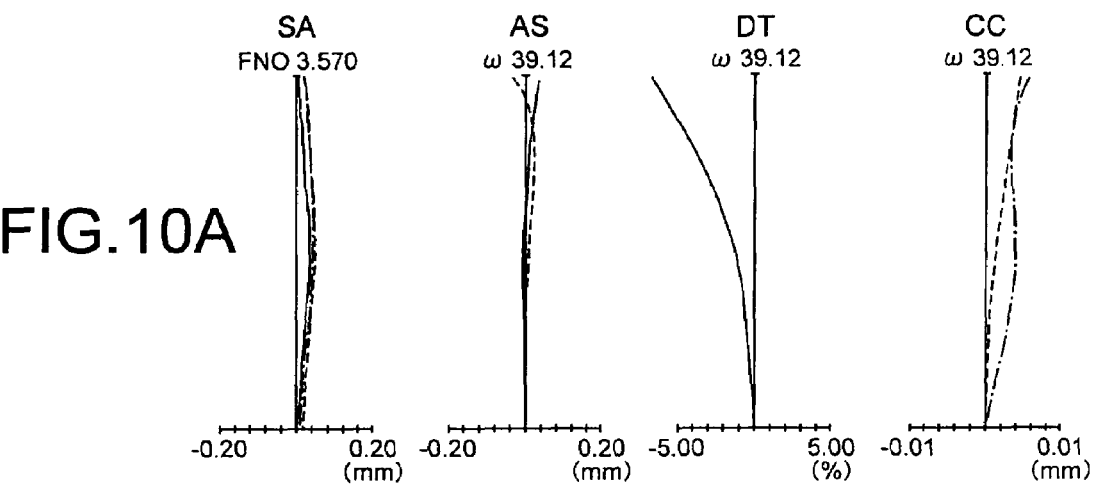
FIG. 10A, FIG. 10B, and FIG. 10C are aberration diagrams at the time of infinite object point focusing in the fourth embodiment.
Figure 10B:
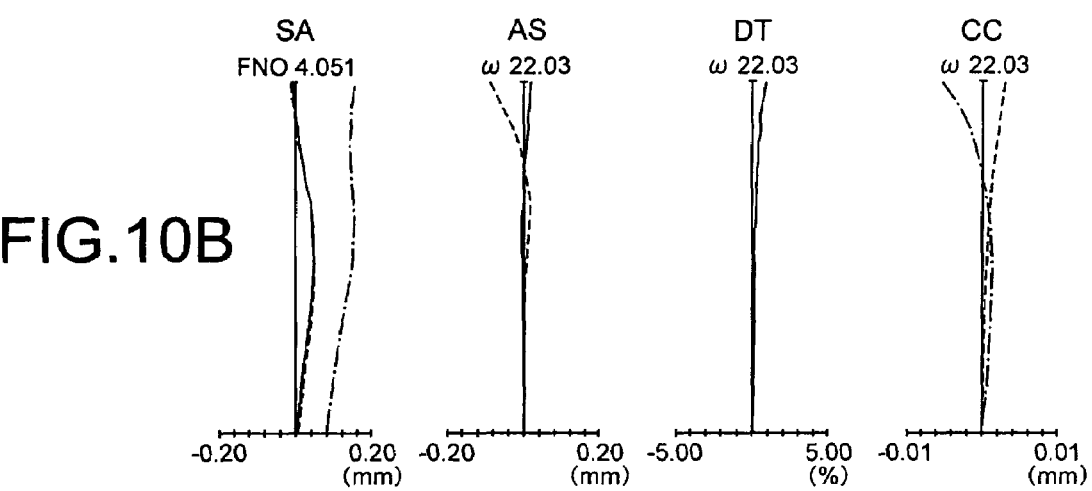
Figure 10C:
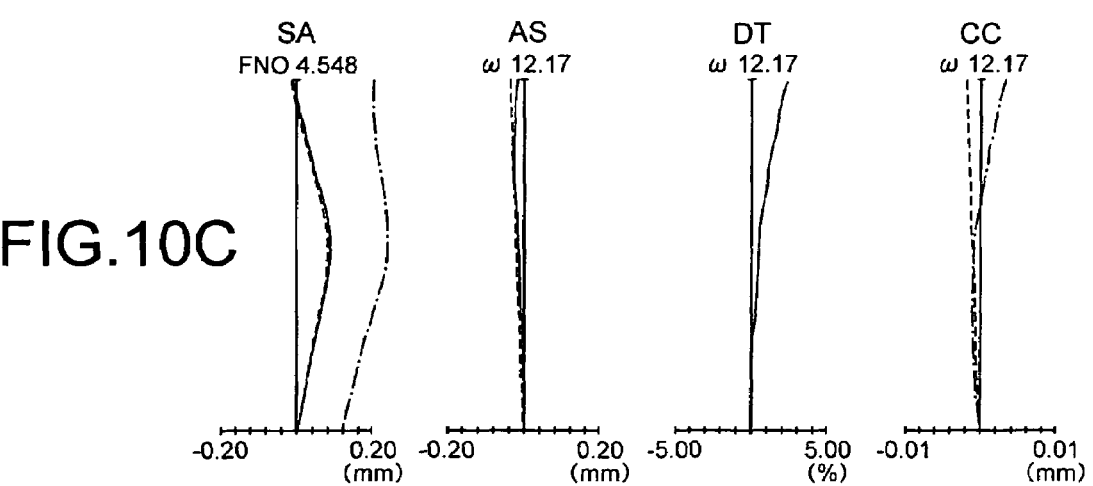

A zoom lens system in the fifth embodiment, as shown in FIG. 5A to FIG. 5C includes, in order from the object side thereof, a first lens unit G1 having a positive refracting power, a second lens unit G2 having a negative refracting power, an aperture stop S, a third lens unit G3 having a positive refracting power, a fourth lens unit G4 having a positive refracting power, and a fifth lens unit G5 having a negative refracting power.

At the time of zooming from the wide angle end to the telephoto end, the first lens unit G1 is fixed, the second lens unit G2 moves toward the object side and the image side, the third lens unit G3 is fixed, the fourth lens unit G4 moves toward the object side, and the fifth lens unit G5 is fixed. Moreover, the aperture stop S is fixed, and an amount of light is adjusted by changing an aperture size.

In order from the object side, the first lens unit G1 includes a biconcave negative lens, an optical path bending prism P, and a positive meniscus lens having a convex surface directed toward the object side. The second lens unit G2 includes a biconcave negative lens, and a cemented lens of a positive meniscus lens having a convex surface directed toward the image side and a biconcave negative lens. The third lens unit G3 includes a positive meniscus lens having a convex surface directed toward the object side. The fourth lens unit G4 includes a cemented lens of a biconvex positive lens and a negative meniscus lens having a convex surface directed toward the image side. The fifth lens unit G5 includes a cemented lens of a biconcave negative lens and a biconvex positive lens, and a positive meniscus lens having a convex surface directed toward the object side.

An aspheric surface is used for six surfaces namely, a surface on the image side of the biconcave negative lens in the first lens unit G1, both surfaces of the positive meniscus lens in the first lens unit G1, both surfaces of the positive meniscus lens in the third lens unit G3, and a surface on the object side of the biconvex positive lens in the fourth lens unit G4.

Numerical data of each embodiment described above is shown below. Apart from symbols described above, f denotes a focal length of the entire zoom lens system, BF denotes a back focus, each of f1, f2, . . . denotes a focal length of each lens unit, IH denotes an image height, FNO denotes an F number, ω denotes a half image angle, WE denotes a wide angle end, ST denotes an intermediate state, TE denotes a telephoto end, each of r1, r2, . . . denotes a radius of curvature of each lens surface, each of d1, d2, . . . denotes a distance between two lenses, each of nd, . . . denotes a refractive index of each lens for a d-line, and each of vd . . . denotes an Abbe's number for each lens. The overall length of the lens system which will be described later is a length which is obtained by adding the back focus to a distance from the first lens surface up to the last lens surface. BF (back focus) is a unit which is expressed upon air conversion of a distance from the last lens surface up to a paraxial image plane.

When x is let to be an optical axis with a direction of traveling of light as a positive direction, and y is let to be in a direction orthogonal to the optical axis, a shape of the aspheric surface is described by the following expression.

$$x = (y^2/r)/[1+\{1-(K+1)(y/r)^2\}^{1/2}] + A_4 y^4 + A_6 y^6 + A_8 y^8 + A_{10} y^{10} + A_{12} y^{12}$$

where, r denotes a paraxial radius of curvature, K denotes a conical coefficient, $A_4, A_6, A_8, A_{10}$, and $A_{12}$ denote aspherical-surface coefficients of a fourth order, a sixth order, an eight order, a tenth order, and a twelfth order respectively.

Moreover, in the aspherical surface coefficients, 'e-n' ('e$^{-n}$') (where, n is an integral number) indicates '10$^{-n}$'.

EXAMPLE 1 unit mm
Surface data

| surface No. | r | d | nd | vd |
|---|---|---|---|---|
| 1 | 55.879 | 0.74 | 2.00069 | 25.46 |
| 2 | 9.501 | 2.64 | | |
| 3 | ∞ | 8.20 | 1.90366 | 31.31 |
| 4 | ∞ | 0.20 | | |
| 5* | 19.185 | 2.80 | 1.76802 | 49.24 |
| 6* | −14.366 | Variable | | |
| 7* | −25.592 | 0.74 | 1.83481 | 42.71 |
| 8* | 26.661 | 0.74 | | |
| 9 | −17.188 | 1.81 | 1.92286 | 20.88 |
| 10 | −7.239 | 0.70 | 1.88300 | 40.76 |
| 11 | 66.345 | Variable | | |
| 12* | 19.931 | 1.01 | 1.67790 | 55.34 |
| 13* | −61.239 | 0.60 | | |
| 14(S) | | Variable | | |
| 15* | 7.455 | 2.52 | 1.49700 | 81.54 |
| 16* | −24.398 | 0.15 | | |
| 17 | 7.284 | 3.00 | 1.75500 | 52.32 |
| 18 | −26.330 | 0.61 | 2.00330 | 28.27 |
| 19 | 4.475 | Variable | | |
| 20 | 12.017 | 2.18 | 1.49700 | 81.54 |
| 21 | −60.611 | Variable | | |
| 22 | ∞ | 0.50 | 1.54771 | 62.84 |
| 23 | ∞ | 0.50 | | |
| 24 | ∞ | 0.50 | 1.51633 | 64.14 |
| 25 | ∞ | 0.37 | | |
| Image plane (Light receiving surface) | ∞ | | | |

Aspherical coefficients

5th surface k = 0.000, A4 = −3.35814e−05, A6 = −2.66941e−06, A8 = −1.24427e−07, A10 = −2.70997e−09

6th surface k = 0.000, A4 = 4.27276e−05, A6 = −1.53073e−06, A8 = 7.81923e−08, A10 = −1.96173e−09

7th surface k = 0.000, A4 = 3.46457e−04, A6 = −3.10453e−05, A8 = 9.28879e−07, A10 = −1.68327e−08

8th surface k = 0.000, A4 = 3.37536e−04, A6 = −2.54529e−05, A8 = 2.09249e−07

12th surface k = 0.000, A4 = 2.41522e−04, A6 = 2.10041e−05, A8 = −9.98821e−07

13th surface k = 0.000, A4 = 1.88466e−04, A6 = 4.20577e−05, A8 = −2.44231e−06

15th surface k = 0.000, A4 = −2.22549e−04, A6 = 4.16143e−05, A8 = −2.78800e−06, A10 = 1.22405e−07

16th surface k = 0.000, A4 = 1.41387e−04, A6 = 3.82748e−05, A8 = −2.26325e−06, A10 = 1.26788e−07

Zoom data(∞)

| | WE | ST | TE |
|---|---|---|---|
| f (mm) | 5.08 | 9.24 | 17.75 |
| Fno. | 3.57 | 4.51 | 5.10 |
| 2ω (°) | 82.87 | 44.68 | 23.84 |
| IH | 3.84 | 3.84 | 3.84 |
| d6 | 0.60 | 4.07 | 7.66 |
| d11 | 7.56 | 4.10 | 0.50 |
| d14 | 8.91 | 5.11 | 1.05 |
| d19 | 2.78 | 6.97 | 9.70 |
| d21 | 3.16 | 2.76 | 4.09 |

EXAMPLE 2 unit mm
Surface data

| surface No. | r | d | nd | vd |
|---|---|---|---|---|
| 1 | 94.620 | 0.80 | 2.00069 | 25.46 |
| 2 | 10.091 | 2.42 | | |
| 3 | ∞ | 8.20 | 1.90366 | 31.31 |
| 4 | ∞ | 0.20 | | |
| 5* | 17.799 | 2.80 | 1.76802 | 49.24 |
| 6* | −14.462 | Variable | | |
| 7* | −38.540 | 0.69 | 1.83481 | 42.71 |
| 8* | 22.125 | 1.02 | | |
| 9 | −12.291 | 1.81 | 1.92286 | 20.88 |
| 10 | −6.346 | 0.70 | 1.88300 | 40.76 |
| 11 | 388.644 | Variable | | |
| 12* | 12.627 | 1.07 | 1.67790 | 55.34 |
| 13* | 107.441 | 0.59 | | |
| 14(S) | | Variable | | |
| 15* | 8.255 | 2.31 | 1.49700 | 81.54 |
| 16* | −26.827 | 0.15 | | |
| 17 | 6.965 | 3.36 | 1.75500 | 52.32 |
| 18 | −15.860 | 0.61 | 2.00330 | 28.27 |
| 19 | 4.442 | Variable | | |
| 20 | 10.799 | 2.53 | 1.48749 | 70.23 |
| 21 | −32.352 | Variable | | |
| 22 | ∞ | 0.50 | 1.54771 | 62.84 |
| 23 | ∞ | 0.50 | | |
| 24 | ∞ | 0.50 | 1.51633 | 64.14 |
| 25 | ∞ | 0.37 | | |
| Image plane (Light receiving surface) | ∞ | | | |

Aspherical coefficients

5th surface k = 0.000, A4 = −1.74286e−05, A6 = −4.90551e−06, A8 = 2.16049e−07, A10 = −3.54125e−09

6th surface k = 0.000, A4 = 7.74875e−05, A6 = −4.01517e−06, A8 = 1.87904e−07, A10 = −3.17544e−09

7th surface k = 0.000, A4 = 8.69830e−04, A6 = −5.43495e−05, A8 = 1.24045e−06, A10 = −1.96967e−08

8th surface k = 0.000, A4 = 9.08000e−04, A6 = −4.45144e−05, A8 = −2.03614e−08

12th surface k = 0.000, A4 = 8.02256e−04, A6 = 3.87597e−05, A8 = 8.67712e−07

13th surface k = 0.000, A4 = 9.09983e−04, A6 = 4.81706e−05, A8 = 1.20183e−06

15th surface k = 0.000, A4 = −3.82018e−06, A6 = 3.54013e−05, A8 = −2.64602e−06, A10 = 1.47956e−07

16th surface k = 0.000, A4 = 2.12556e−04, A6 = 3.84434e−05, A8 = −3.21279e−06, A10 = 2.00561e−07

-continued

Zoom data(∞)

| | WE | ST | TE |
|---|---|---|---|
| f (mm) | 5.09 | 9.39 | 17.74 |
| Fno. | 3.57 | 4.47 | 5.10 |
| 2ω (°) | 82.43 | 43.96 | 23.93 |
| IH | 3.84 | 3.84 | 3.84 |
| d6 | 0.60 | 4.17 | 7.49 |
| d11 | 7.37 | 3.82 | 0.50 |
| d14 | 9.01 | 5.16 | 1.05 |
| d19 | 2.76 | 6.53 | 9.85 |
| d21 | 2.63 | 2.70 | 3.48 |

EXAMPLE 3 unit mm
Surface data

| surface No. | r | d | nd | vd |
|---|---|---|---|---|
| 1 | 110.793 | 0.80 | 2.00069 | 25.46 |
| 2 | 10.296 | 2.35 | | |
| 3 | ∞ | 8.40 | 1.90366 | 31.31 |
| 4 | ∞ | 0.16 | | |
| 5* | 19.319 | 2.80 | 1.76802 | 49.24 |
| 6* | −14.066 | Variable | | |
| 7* | −63.073 | 0.71 | 1.88300 | 40.76 |
| 8 | 16.117 | 0.96 | | |
| 9 | −13.958 | 1.62 | 1.92286 | 20.88 |
| 10 | −6.291 | 0.70 | 1.88300 | 40.76 |
| 11 | −1134.962 | Variable | | |
| 12* | 7.264 | 1.14 | 1.55087 | 71.79 |
| 13* | 23.042 | 0.63 | | |
| 14(S) | | Variable | | |
| 15* | 7.912 | 2.38 | 1.55087 | 71.79 |
| 16* | 46.701 | 0.15 | | |
| 17 | 7.300 | 2.96 | 1.88300 | 40.76 |
| 18 | −11.443 | 0.66 | 2.00069 | 25.46 |
| 19 | 4.915 | Variable | | |
| 20 | 9.243 | 2.35 | 1.49700 | 81.54 |
| 21 | 266.816 | Variable | | |
| 22 | ∞ | 0.50 | 1.54771 | 62.84 |
| 23 | ∞ | 0.50 | | |
| 24 | ∞ | 0.50 | 1.51633 | 64.14 |
| 25 | ∞ | 0.37 | | |
| Image plane (Light receiving surface) | ∞ | | | |

Aspherical coefficients

5th surface k = 0.000, A4 = −7.96935e−07, A6 = −5.02527e−06, A8 = 2.31046e−07, A10 = −4.67786e−09
6th surface k = 0.000, A4 = 8.56548e−05, A6 = −3.14941e−06, A8 = 1.50538e−07, A10 = −3.40658e−09
7th surface k = 0.000, A4 = −3.56844e−06, A6 = 9.98511e−07, A8 = −1.60774e−07
12th surface k = 0.000, A4 = 1.59568e−03, A6 = 4.25525e−05, A8 = 1.09265e−05
13th surface k = 0.000, A4 = 2.14185e−03, A6 = 6.47142e−05, A8 = 1.62205e−05
15th surface k = 0.000, A4 = 7.15811e−04, A6 = 2.38332e−05, A8 = 8.38892e−07, A10 = 4.82105e−08

-continued

16th surface k = 0.000, A4 = 1.22870e−03, A6 = 3.94324e−05, A8 = −2.46195e−07, A10 = 2.99993e−07

Zoom data(∞)

| | WE | ST | TE |
|---|---|---|---|
| f (mm) | 5.08 | 9.32 | 17.73 |
| Fno. | 3.57 | 4.48 | 5.10 |
| 2ω (°) | 81.72 | 44.15 | 23.88 |
| IH | 3.84 | 3.84 | 3.84 |
| d6 | 0.60 | 4.28 | 8.06 |
| d11 | 7.94 | 4.29 | 0.50 |
| d14 | 8.95 | 4.86 | 1.05 |
| d19 | 2.84 | 7.50 | 10.49 |
| d21 | 2.56 | 1.96 | 2.77 |

EXAMPLE 4 unit mm
Surface data

| surface No. | r | d | nd | vd |
|---|---|---|---|---|
| 1 | ∞ | 0.80 | 2.00069 | 25.46 |
| 2 | 11.678 | 2.17 | | |
| 3 | ∞ | 8.40 | 1.90366 | 31.32 |
| 4 | ∞ | 0.16 | | |
| 5* | 16.037 | 2.64 | 1.76802 | 49.24 |
| 6* | −15.692 | Variable | | |
| 7 | −57.513 | 0.70 | 1.88300 | 40.76 |
| 8 | 11.157 | 1.05 | | |
| 9 | −21.049 | 1.62 | 1.92286 | 20.88 |
| 10 | −6.983 | 0.70 | 1.88300 | 40.76 |
| 11 | 237.248 | Variable | | |
| 12* | 6.832 | 1.23 | 1.55087 | 71.79 |
| 13* | 18.866 | 0.63 | | |
| 14(S) | | Variable | | |
| 15* | 8.327 | 2.44 | 1.55087 | 71.79 |
| 16* | −28.146 | 0.15 | | |
| 17 | 8.647 | 2.66 | 1.88300 | 40.76 |
| 18 | −39.717 | 0.74 | 2.00069 | 25.46 |
| 19 | 4.560 | Variable | | |
| 20* | 10.171 | 2.94 | 1.49700 | 81.54 |
| 21 | −121.543 | 2.49 | | |
| 22 | ∞ | 0.50 | 1.54771 | 62.84 |
| 23 | ∞ | 0.50 | | |
| 24 | ∞ | 0.50 | 1.51633 | 64.14 |
| 25 | ∞ | 0.37 | | |
| Image plane (Light receiving surface) | ∞ | | | |

Aspherical coefficients

5th surface k = 0.000, A4 = −4.70720e−06, A6 = −4.77883e−06, A8 = 2.63447e−07, A10 = −5.49536e−09
6th surface k = 0.000, A4 = 9.65912e−05, A6 = −2.86497e−06, A8 = 1.77246e−07, A10 = −4.17301e−09
12th surface k = 0.000, A4 = 1.36320e−03, A6 = 4.54543e−06, A8 = 9.34431e−06
13th surface k = 0.000, A4 = 2.03644e−03, A6 = −5.56638e−06, A8 = 1.59247e−05

-continued

15th surface k = 0.000, A4 = −2.88102e−04, A6 = −3.59977e−05, A8 = 2.96404e−06, A10 = −1.34151e−07

16th surface k = 0.000, A4 = −7.82012e−05, A6 = −3.28073e−05, A8 = 2.55029e−06, A10 = −1.13782e−07

20th surface k = 0.000, A4 = −4.07150e−05, A6 = 3.37619e−06

| Zoom data(∞) | | | |
|---|---|---|---|
| | WE | ST | TE |
| f (mm) | 5.07 | 9.36 | 19.50 |
| Fno. | 3.57 | 4.37 | 5.10 |
| 2ω (°) | 81.70 | 44.31 | 21.90 |
| IH | 3.84 | 3.84 | 3.84 |
| d6 | 0.60 | 4.29 | 7.78 |
| d11 | 7.66 | 3.98 | 0.50 |
| d14 | 10.45 | 6.34 | 1.05 |
| d19 | 2.90 | 6.99 | 12.27 |

EXAMPLE 5 unit mm
Surface data

| surface No. | r | d | nd | vd |
|---|---|---|---|---|
| 1 | −215.357 | 0.80 | 2.00170 | 20.60 |
| 2* | 11.627 | 1.81 | | |
| 3 | ∞ | 8.40 | 1.81600 | 46.62 |
| 4 | ∞ | 0.30 | | |
| 5* | 9.196 | 2.58 | 1.80139 | 45.45 |
| 6* | 2066.991 | Variable | | |
| 7 | −101.388 | 0.50 | 1.88300 | 40.76 |
| 8 | 10.175 | 1.11 | | |
| 9 | −102.211 | 1.30 | 1.92286 | 20.88 |
| 10 | −7.495 | 0.46 | 1.88300 | 40.76 |
| 11 | 19.286 | Variable | | |
| 12* | 7.438 | 1.55 | 1.67790 | 55.34 |
| 13* | 48.124 | 1.00 | | |
| 14(S) | | Variable | | |
| 15* | 8.066 | 3.27 | 1.62299 | 58.12 |
| 16 | −6.213 | 0.54 | 1.92286 | 20.88 |
| 17 | −12.576 | Variable | | |
| 18 | −12.055 | 0.50 | 2.00330 | 28.27 |
| 19 | 6.159 | 3.27 | 1.51633 | 64.14 |
| 20 | −12.008 | 0.96 | | |
| 21 | 11.752 | 1.80 | 1.84666 | 23.78 |
| 22 | 13.545 | 2.44 | | |
| 23 | ∞ | 0.50 | 1.51680 | 64.20 |
| 24 | ∞ | 0.50 | | |
| 25 | ∞ | 0.50 | 1.51680 | 64.20 |
| 26 | ∞ | 0.37 | | |
| Image plane (Light receiving surface) | ∞ | | | |

Aspherical coefficients

2nd surface k = 0.000, A4 = −2.80087e−04, A6 = 2.57808e−07, A8 = −6.14100e−09

5th surface k = 0.000, A4 = −9.94851e−05, A6 = −1.07743e−06, A8 = 6.82436e−09, A10 = −7.48279e−12

6th surface k = 0.000, A4 = 1.76563e−04, A6 = −1.61036e−06, A8 = 2.96282e−08, A10 = −5.43384e−11

12th surface k = 0.000, A4 = 1.90780e−04, A6 = 1.24591e−05, A8 = 1.38666e−06, A10 = 3.36379e−08

13th surface k = 0.000, A4 = 5.39898e−04, A6 = 7.51223e−06, A8 = 3.65925e−06, A10 = −5.29379e−08

15th surface k = 0.000, A4 = −4.16938e−04, A6 = 3.24274e−05, A8 = −4.85028e−06, A10 = 2.36668e−07

| Zoom data(∞) | | | |
|---|---|---|---|
| | WE | ST | TE |
| f (mm) | 5.07 | 9.40 | 17.40 |
| Fno. | 3.57 | 4.05 | 4.55 |
| 2ω (°) | 78.25 | 44.06 | 24.34 |
| IH | 3.84 | 3.84 | 3.84 |
| d6 | 0.60 | 6.62 | 10.70 |
| d11 | 10.60 | 4.58 | 0.50 |
| d14 | 6.08 | 4.22 | 2.05 |
| d17 | 1.51 | 3.37 | 5.54 |

Further, another value of the embodiments 1 to 5 are described below.

| BF | | | | | |
|---|---|---|---|---|---|
| | WE | ST | TE | Total length | Zoom ratio |
| Example 1 | 4.68 | 4.28 | 5.61 | 53.15 | 3.49 |
| Example 2 | 4.15 | 4.21 | 5.00 | 53.15 | 3.49 |
| Example 3 | 4.08 | 3.48 | 4.30 | 53.15 | 3.49 |
| Example 4 | 4.00 | 4.00 | 4.00 | 54.65 | 3.84 |
| Example 5 | 3.97 | 3.97 | 3.97 | 52.90 | 3.43 |

| Group focal length | | | | | |
|---|---|---|---|---|---|
| | G1 | G2 | G3 | G4 | G5 |
| Example 1 | 15.17 | −7.65 | 22.33 | 18.92 | 20.27 |
| Example 2 | 14.77 | −7.42 | 21.00 | 20.18 | 17.02 |
| Example 3 | 15.25 | −7.61 | 18.78 | 23.04 | 19.20 |
| Example 4 | 14.74 | −7.08 | 18.76 | 21.73 | 19.03 |
| Example 5 | 20.34 | −6.47 | 12.78 | 10.23 | −11.03 |

Aberration diagrams at the time of infinite object point focusing in the first embodiment to the fifth embodiment are shown in FIG. 6A to FIG. 10C respectively. In these aberration diagrams, FIG. 6A, FIG. 7A, FIG. 8A, FIG. 9A, and FIG. 10A show a spherical aberration, an astigmatism, a distortion, and a chromatic aberration of magnification at the wide angle end, FIG. 6B, FIG. 7B, FIG. 8B, FIG. 9B, and FIG. 10B show the spherical aberration, the astigmatism, the distortion, and the chromatic aberration of magnification at the intermediate focal length state, and FIG. 6C, FIG. 7C, FIG. 8C, FIG. 9C, and FIG. 10C shows the spherical aberration, the astigmatism, the distortion, and the chromatic aberration of magnification at the telephoto end. In each diagrams, "ω" shows a half-image angle.

Next, zoom lens systems in the image pickup apparatuses according to the embodiments from the sixth embodiment to the tenth embodiment will be described below. In the embodiments from the sixth embodiment to the tenth embodiment, recording and display of an image is carried out upon correcting electrically the pin-cushion distortion at the telephoto side and a barrel distortion occurring at the wide angle end. The zoom lens system in the sixth embodiment has the same structure as the zoom lens system in the first embodiment. The zoom lens system in the seventh embodiment has the same structure as the zoom lens system in the second embodiment. The zoom lens system in the eighth embodiment has the same structure as the zoom lens system in the third embodiment. The zoom lens system in the ninth embodiment has the same structure as the zoom lens system in the fourth embodiment. The zoom lens system in the tenth embodiment has the same structure as the zoom lens system in the fifth embodiment. Therefore, repeated description of the zoom lens system is omitted.

Data of the image height and full-image angle in the sixth embodiment is shown below.

|  | WE | ST | TE |
|---|---|---|---|
| f(mm) | 5.08 | 9.24 | 17.75 |
| Fno. | 3.57 | 4.51 | 5.10 |
| 2ω(°) | 78.28 | 44.68 | 23.84 |
| IH | 3.59 | 3.84 | 3.84 |

Data of the image height and full-image angle in the seventh embodiment is shown below.

|  | WE | ST | TE |
|---|---|---|---|
| f(mm) | 5.09 | 9.39 | 17.74 |
| Fno. | 3.57 | 4.47 | 5.10 |
| 2ω(°) | 78.18 | 43.96 | 23.93 |
| IH | 3.60 | 3.84 | 3.84 |

Data of the image height and full-image angle in the eighth embodiment is shown below.

|  | WE | ST | TE |
|---|---|---|---|
| f(mm) | 5.08 | 9.32 | 17.73 |
| Fno. | 3.57 | 4.48 | 5.10 |
| 2ω(°) | 78.10 | 44.15 | 23.88 |
| IH | 3.63 | 3.84 | 3.84 |

Data of the image height and full-image angle in the ninth embodiment is shown below.

|  | WE | ST | TE |
|---|---|---|---|
| f(mm) | 5.07 | 9.36 | 19.50 |
| Fno. | 3.57 | 4.37 | 5.10 |
| 2ω(°) | 78.12 | 44.31 | 21.90 |
| IH | 3.63 | 3.84 | 3.84 |

Data of the image height and full-image angle in the tenth embodiment is shown below.

|  | WE | ST | TE |
|---|---|---|---|
| f(mm) | 5.07 | 9.40 | 17.40 |
| Fno. | 3.57 | 4.05 | 4.55 |
| 2ω(°) | 76.54 | 44.06 | 24.34 |
| IH | 3.74 | 3.84 | 3.84 |

Data of the conditional expressions (1) to (6) according to the each of embodiments are shown below.

|  | Example 1 | Example 2 | Example 3 | Example 4 | Example 5 |
|---|---|---|---|---|---|
| (1) $f_1/f_w$ | 2.98 | 2.88 | 3.00 | 2.90 | 4.01 |
| (2) $\tan^{-1}(IH_w/f_w)$ | 37.06 | 37.04 | 37.11 | 37.12 | 37.14 |
| (3) $|f_{L1n}/f_w|$ | 2.27 | 2.23 | 2.24 | 2.30 | 2.17 |
| (4) $N_{1d}$ | 2.00069 | 2.00069 | 2.00069 | 2.00069 | 2.0017 |
| (5) $|f_T/f_{L1p}|$ | 1.60 | 1.64 | 1.61 | 1.82 | 1.51 |
| (6) $|f_2/f_w|$ | 1.50 | 1.45 | 1.50 | 1.39 | 1.28 |

|  | Example 6 | Example 7 | Example 8 | Example 9 | Example 10 |
|---|---|---|---|---|---|
| (1) $f_1/f_w$ | 2.98 | 2.88 | 3.00 | 2.90 | 4.01 |
| (2) $\tan^{-1}(IH_w/f_w)$ | 35.23 | 35.29 | 35.57 | 35.62 | 36.41 |
| (3) $|f_{L1n}/f_w|$ | 2.27 | 2.23 | 2.24 | 2.30 | 2.17 |
| (4) $N_{1d}$ | 2.00069 | 2.00069 | 2.00069 | 2.00069 | 2.0017 |
| (5) $|f_T/f_{L1p}|$ | 1.60 | 1.64 | 1.61 | 1.82 | 1.51 |
| (6) $|f_2/f_w|$ | 1.50 | 1.45 | 1.50 | 1.39 | 1.28 |

Incidentally, for preventing the occurrence of the ghost and the flare, generally, the antireflection coating is applied to a surface of a lens in contact with air.

On the other hand, at a cemented surface of a cemented lens, a refractive index of an adhesive is sufficiently higher than a refractive index of air. Therefore, in many cases, a reflectance is originally of the level of a single-layer coating, or lower, and the coating is applied in few cases. However, when the antireflection coating is applied positively even to the cemented surface, it is possible to reduce further the ghost and the flare, and to achieve a more favorable image.

Particularly, recently, a glass material having a high refractive index has been widely used in an optical system of cameras, for having a high effect on the aberration correction. However, when the glass material having a high refractive index is used as a cemented lens, a reflection at the cemented surface becomes unignorable. In such a case, applying the antireflection coating on the cemented surface is particularly effective.

An effective usage of the cemented surface coating has been disclosed in Japanese Patent Application Laid-open Publication No. Hei 2-27301, No. 2001-324676, No. 2005-92115, and U.S. Pat. No. 7,116,482. In these patent literatures, a cemented lens surface coating in a first lens unit of a positive preceding zoom lens system has been described, and the same as disclosed in these patent literatures may be implemented for the cemented lens surface in the first lens unit having a positive power, of the present invention.

As a coating material to be used, according to a refractive index of the adhesive material and a refractive index of the lens which is a base, coating materials such as $Ta_2O_5$, $TiO_2$, $Nb_2O_5$, $ZrO_2$, $HfO_2$, $CeO_2$, $SnO_2$, $In_2O_3$, $ZnO$, and $Y_2O_3$ having a comparatively higher refractive index, and coating materials such as $MgF_2$, $SiO_2$, and $Al_2O_3$ having a comparatively lower refractive index may be selected appropriately, and set to a film thickness which satisfies phase conditions.

Naturally, similar to the coating on the surface of the lens in contact with air, the coating on the cemented surface may also be let to be a multi layer coating. By combining appropriately a film thickness and a coating material of number of films not less than in two layers, it is possible to reduce further the reflectance, and to control spectral characteristics and angular characteristics.

Moreover, it is needless to mention that for the cemented surface of lenses other than the lenses in the first lens unit, it is effective to apply the coating on the cemented surface based on a similar idea.

(Correction of Distortion)

Incidentally, when the zoom lens system of the present invention is used, a digital correction of distortion of an image is carried out electrically. A basic concept for the digital correction of the distortion of an image will be described below.

Figure 12:
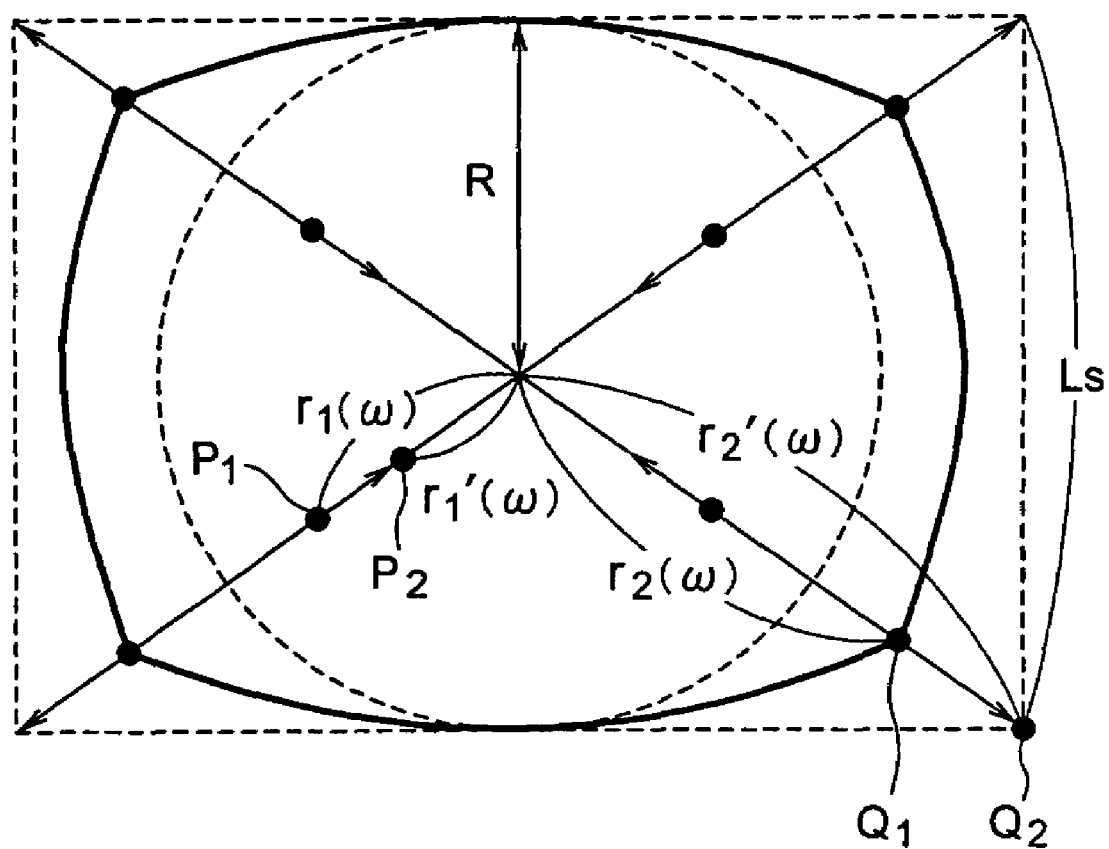
FIG. 12 is a diagram describing a correction of a distortion.

For example, as shown in FIG. 12, with a point of intersection of an optical axis and an image pickup plane to be a center, a magnification on a circumference (image height) of a circle of radius R making a contact internally with a longer side of an effective image pickup plane is fixed, and this circumference is let to be a base reference for the correction. Next, each point on a circumference (image height) of an arbitrary radius $r(\omega)$ other than the radius R is moved in a substantial direction of radiation, and the correction is carried out by moving on a concentric circle such that the radius becomes $r'(\omega)$.

For example, in FIG. 12, a point $P_1$ on a circumference of an arbitrary radius $r_1(\omega)$ positioned at an inner side of a circle of radius R is moved to a point $P_2$ on a circumference of a radius $r_1'(\omega)$ which is to be corrected, directed toward a center of the circle. Moreover, a point $Q_1$ on a circumference of an arbitrary radius $r_2(\omega)$ positioned at an outer side of the circle of radius R is moved to a point $Q_2$ on a circumference of a radius $r_2'(\omega)$ which is to be corrected, directed toward a direction away from the center of the circle.

Here, $r'(\omega)$ can be expressed as follows.

$$r'(\omega) = \alpha \cdot f \cdot \tan \omega \, (0 \leq \alpha \leq 1)$$

where, $\omega$ is a half image angle of an object and f is a focal length of an imaging optical system (the zoom lens system in the present invention).

Here, when an ideal image height corresponding to a circle (image height) of radius R is let to be Y, then $$\alpha = R/Y = R/(f \cdot \tan \omega).$$

The optical system, ideally, is rotationally symmetric with respect to an optical axis. In other words, the distortion also occurs in a rotationally symmetric manner with respect to the optical axis. Consequently, as it has been described above, in a case of correcting electrically the optical distortion, when it is possible to carry out correction by fixing a magnification on a circumference (image height) of the circle of radius R making a contact internally with a longer side of the effective image pickup plane, with a point of intersection of an optical axis on a reproduced image, and an image pickup plane to be a center, and moving each point on the circumference (image height) of radius $r(\omega)$ other than the radius R in a substantial direction of radiation, and moving on a concentric circle such that the radius becomes $r'(\omega)$, it can be considered to be advantageous from a point of amount of data and amount of calculation.

Incidentally, an optical image ceases to be a continuous amount at a point of time when an image is picked up by an electronic image pickup element (due to sampling). Consequently, the circle of radius R which is drawn exactly on the optical image ceases to be an accurate circle as long as pixels on the electronic image pickup element are not arranged radially.

In other words, regarding a shape correction of image data expressed for each discrete coordinate point, a circle which can fix the magnification does not exist. Therefore, for each pixel (Xi, Yj), a method of determining coordinates of a destination of movement (Xi', Yj') may be used. When two or more points (Xi, Yj) have moved to the coordinates (Xi', Yj'), an average of values of each pixel is taken. Moreover, when there is no point which has moved, interpolation may be performed by using a value of coordinate (Xi', Yj') of some of the surrounding pixels.

Such method is effective for correction when the distortion with respect to the optical axis is remarkable due to a manufacturing error etc. of the optical system or the electronic image pickup element, in the electronic image pickup apparatus having the zoom lens system in particular, and when the circle of the radius R drawn on the optical image is asymmetric. Moreover, it is effective for correction when there occurs to be a geometric distortion at the time of reproducing a signal to an image in an image pickup element or various output devices.

In the electronic image pickup apparatus of the present invention, for calculating a correction amount $r'(\omega) - r(\omega)$, an arrangement may be made such that a relationship between $r(\omega)$, in other words, half image angle and the image height, or a relationship between a real image height r and an ideal image height $r'/\alpha$ is recorded in a recording medium which is built-in in the electronic image pickup apparatus.

For an image after the distortion correction, not to have an extreme shortage of an amount of light at both ends in a direction of short side, the radius R may satisfy the following conditional expression.

$$0 \leq R \leq 0.6 \, Ls$$

where, Ls is a length of a short side of the effective image pickup surface.

It is preferable that the radius R satisfies the following conditional expression.

$$0.3 \, Ls \leq R \leq 0.6 \, Ls$$

Furthermore, it is most advantageous to match the radius R with a radius of a circle making an internal contact in a short side direction of a substantially effective image pickup plane. In a case of correction in which, the magnification is fixed near the radius R=0, in other words, near on the axis, it is somewhat disadvantageous from an aspect of substantial number of images, but it is possible to secure an effect for making the size small even when the angle is widened.

A focal length interval which requires a correction is divided into a number of focal point zones. Moreover, the correction may be carried out with the amount of correction as in a case in which, a correction result which satisfies substantially the following relationship $$r'(\omega) = \alpha \cdot f \cdot \tan \omega$$

near a telephoto end in the focal point zones which are divided.

However, in this case, at a wide angle end in the focal point zones which are divided, a barrel-shape distortion at the wide angel end of the focal point zones which are divided is remained to some extent. Moreover, when the number of divided zones is increased, there arises a need to hold specific data necessary for correction, additionally in a recording medium. Therefore it is not preferable to increase the number of divided zones. Therefore, one or a plurality of coefficients associated with each focal length in the focal point zones which are divided, are calculated in advance. The coefficients may be determined based on a measurement by simulation or by actual equipment.

An amount of correction in a case in which, the correction result which satisfies substantially the following relationship $$r'(\omega)=\alpha \cdot f \tan \omega$$

near the telephoto end in the focal point zones which are divided may be calculated, and may let to be a final amount of correction by multiplying uniformly the coefficient for each focal length with respect to this amount of correction.

Incidentally, when there is no distortion in an image achieved by imaging (forming an image) of an infinite object, the following relationship $$f=y/\tan \omega$$

holds.

Here, y denotes a height (image height) of an image point from the optical axis, f denotes a focal length of an imaging system (zoom lens system in the present invention), and ω denotes an angle (object half image angle) with respect to the optical axis in an object point direction corresponding to image points connecting from a center on an image pickup plane up to a position of y.

When there is a barrel-shape distortion in the imaging system, the relationship becomes $$f > y/\tan \omega.$$

In other words, when the focal length f of the imaging system, and the image height y are let to be fixed, a value of ω becomes large.

(Digital Camera)

Further, the present invention could be applied to an electrical image pick up apparatus, especially a digital camera, video camera etc. in which the object image is formed by the above-mentioned zoom lens, then the object image is light-received such as CCD etc. Such embodiment will be described below.

Figure 13:
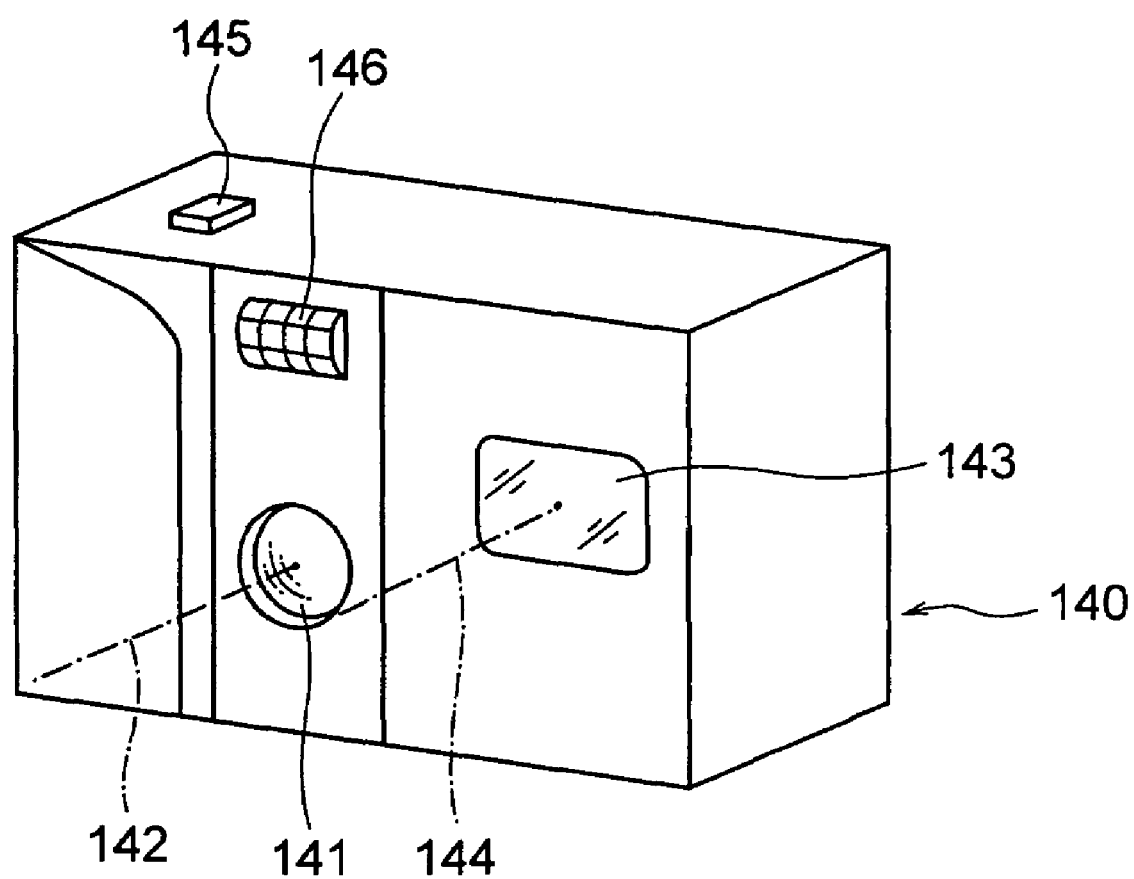
FIG. 13 is a front perspective view showing an appearance of a digital camera in which, the optical path reflecting zoom lens system is incorporated.
Figure 14:
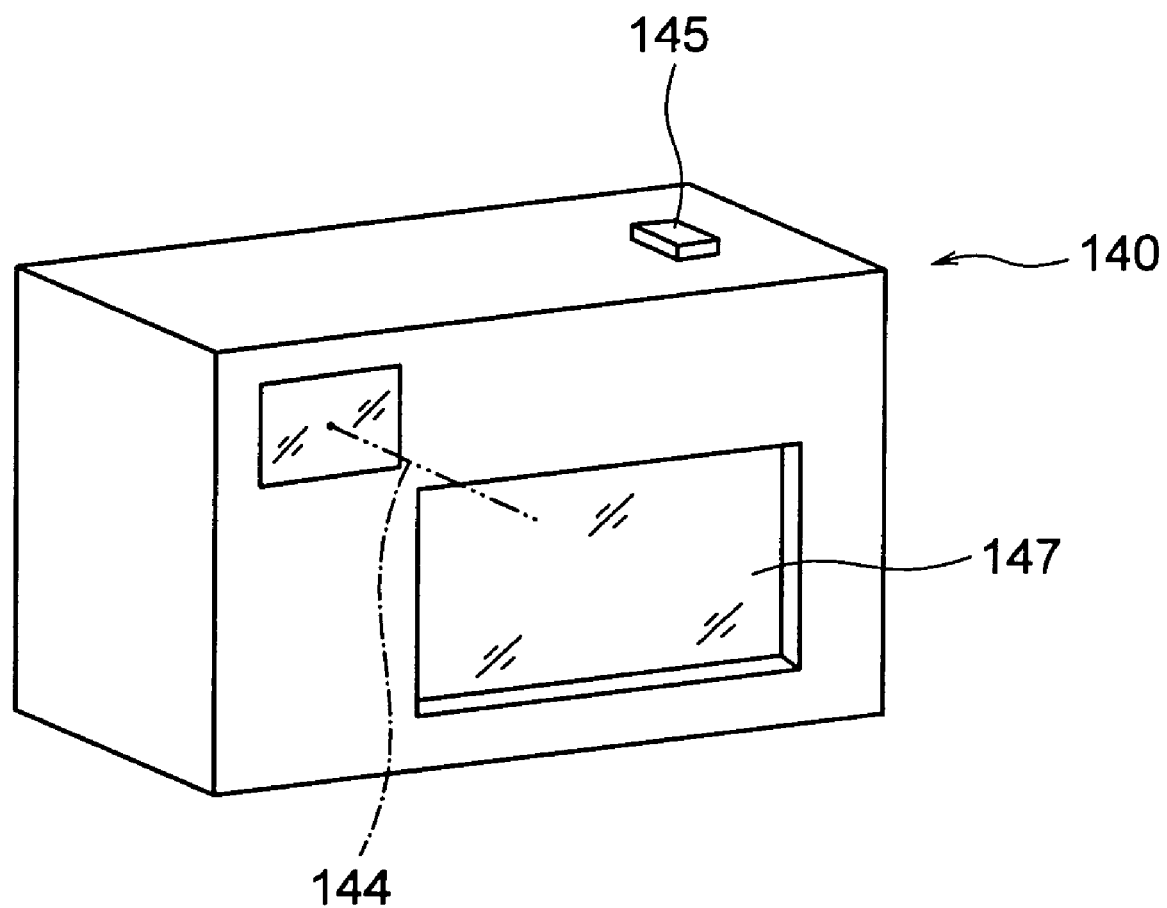
FIG. 14 is a rear perspective view of the digital camera mentioned above.
Figure 15:
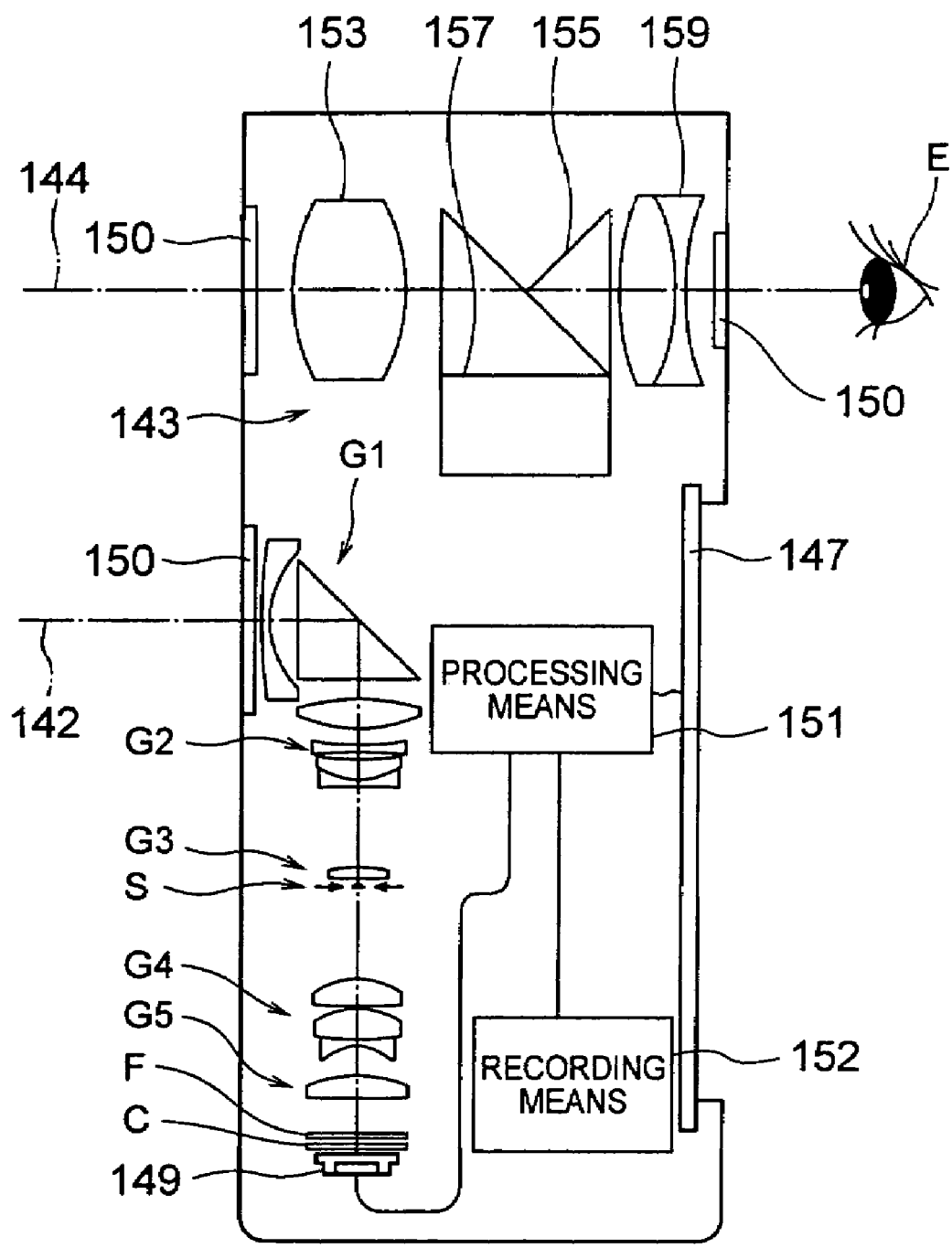
FIG. 15 is a cross-sectional view of the digital camera mentioned above.

FIG. 13 to FIG. 15 are conceptual diagrams of a structure of a digital camera according to the present invention in which a zoom lens system described above is incorporated in a taking optical system 141. FIG. 13 is a front perspective view showing an appearance of a digital camera 140, FIG. 14 is a rear perspective view of the same, and FIG. 15 is a schematic cross-sectional view showing a structure of the digital camera 140. The digital camera 140, in a case of this example, includes the taking optical system 141 having a taking optical path 142, a finder optical system 143 having a finder optical path 144, a shutter button 145, a flash 146, a liquid-crystal display monitor 147, a focal-length changing button 161, and a setting changing switch 162 etc., when the shutter button 145 disposed on an upper portion of the digital camera 140 is pressed, in synchronization with the pressing of the shutter button 145, a photograph is taken by the taking optical system 141 such as the optical path reflecting zoom lens system in the first embodiment. An object image formed by the taking optical system 141 is formed on an image pickup surface of a CCD 149 via a cover glass C and a low pass filter on which a wavelength region restricting coating is applied. An object image which is received as light by the CCD 149 is displayed on the liquid-crystal display monitor 147 which is provided on a rear surface of the digital camera 140 as an electronic image, via a processing means 151. Moreover, a recording means 152 is connected to the processing means 151, and it is also possible to record the electronic image which is taken. The recording means 152 may be provided separately from the processing means 151, or may be formed by recording by writing electronically in a flexible disc, a memory card, or an MO etc. Moreover, the camera may be formed as a silver-salt camera in which a silver-salt film is disposed instead of the CCD 149.

Furthermore, a finder objective optical system 153 is disposed on the finder optical path 144. An object image formed by the finder objective optical system 153 is formed on a field frame 157 of a Porro prism 155 which is an image erecting member. On a rear side of the Porro prism 155, an eyepiece optical system 159 which guides an erected image to a viewer's eyeball, is disposed. A cover member 150 is disposed on an emergence side of the eyepiece optical system 159.

Since the digital camera 140 structured in such manner has the taking optical system 141 according to the present invention, has a high zoom ratio of 3.5 magnifications. Since the zoom lens has a high optical performance, it is possible to realize the inexpensive digital camera in which the depth is extremely thin.

Further, the example shown in FIG. 15, a plane parallel plate is disposed as the cover member 150. However, a lens having a power could be used. Furthermore, the cover member 150 could be omitted.

(Internal Circuit Structure)

Figure 16:
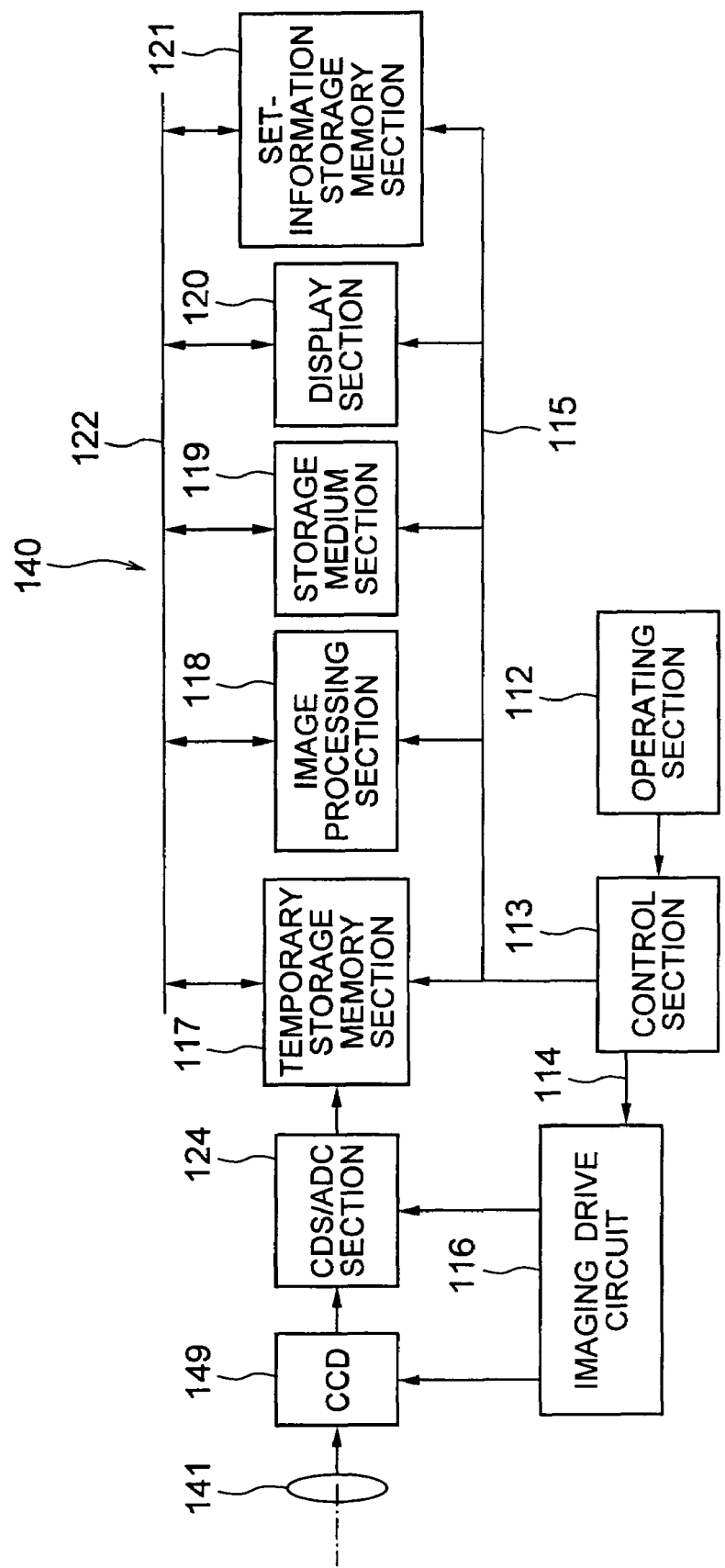
FIG. 16 is a structural block diagram of an internal circuit of main components of a digital camera.

FIG. 16 is a structural block diagram of an internal circuit of main components of the digital camera 140. In the following description, the processing means 151 described above includes for instance, a CDS/ADC section 124, a temporary storage memory 117, and an image processing section 118, and a storage means 152 consists of a storage medium section 119 for example.

As shown in FIG. 16, the digital camera 140 includes an operating section 112, a control section 113 which is connected to the operating section 112, the temporary storage memory 117 and an imaging drive circuit 116 which are connected to a control-signal output port of the control section 113, via a bus 114 and a bus 115, the image processing section 118, the storage medium section 119, a display section 120, and a set-information storage memory section 121.

The temporary storage memory 117, the image processing section 118, the storage medium section 119, the display section 120, and the set-information storage memory section 121 are structured to be capable of mutually inputting and outputting data via a bus 122. Moreover, the CCD 149 and the CDS/ADC section 124 are connected to the imaging drive circuit 116.

The operating section 112 includes various input buttons and switches, and is a circuit which informs the control section, event information which is input from outside (by a user of the digital camera) via these input buttons and switches.

The control section 113 is a central processing unit (CPU), and has a built-in computer program memory which is not shown in the diagram. The control section 113 is a circuit which controls the entire digital camera 140 upon receiving instructions and commands input by the user of the camera via the operating section 112, according to a computer program stored in this computer program memory.

The CCD 149 receives as light an object image which is formed via the taking optical system 141 according to the present invention. The CCD 149 is an image pickup element which is driven and controlled by the imaging drive circuit 116, and which converts an amount of light for each pixel of the object image to an electric signal, and outputs to the CDS/ADC section 124.

The CDS/ADC section 124 is a circuit which amplifies the electric signal which is input from the CCD 149, and carries out analog/digital conversion, and outputs to the temporary storage memory 117 image raw data (bare data, hereinafter called as 'RAW data') which is only amplified and converted to digital data.

The temporary storage memory 117 is a buffer which includes an SDRAM (Synchronous Dynamic Random Access Memory) for example, and is a memory device which stores temporarily the RAW data which is output from the CDS/ADC section 124. The image processing section 118 is a circuit which reads the RAW data stored in the temporary storage memory 117, or the RAW data stored in the storage medium section 119, and carries out electrically various image-processing including the distortion correction, based on image-quality parameters specified by the control section 113.

The storage medium section 119 is a recording medium in the form of a card or a stick including a flash memory for instance, detachably mounted. The storage medium section 119 is a control circuit of a device in which, the RAW data transferred from the temporary storage memory 117 and image data subjected to image processing in the image processing section 118 are recorded and maintained in the card flash memory and the stick flash memory.

The display section 120 includes the liquid-crystal display monitor, and is a circuit which displays images and operation menu on the liquid-crystal display monitor. The set-information storage memory section 121 includes a ROM section in which various image quality parameters are stored in advance, and a RAM section which stores image quality parameters which are selected by an input operation on the operating section 112, from among the image quality parameters which are read from the ROM section. The set-information storage memory section 121 is a circuit which controls an input to and an output from the memories.

The digital camera 140 structured in such manner has the taking optical system 141, according to the present invention, which, while having a sufficient wide angle region, and a compact structure, has an extremely stable imaging performance in the entire magnification region at a high magnification. Therefore, it is possible to realize the high performance, the small size, and widening of the angle. Moreover, a prompt focusing operation at the wide angle side (end) and the telephoto side (end) is possible.

As it has been described above, the present invention is useful for a zoom lens system having a high magnification ratio of about seven times, in which, the slimming of the digital camera is taken into consideration.

In this manner, the image pickup apparatus according to the present invention is useful for a video camera and a digital camera with a high zooming ratio and at a low price.

As it is evident from the abovementioned description, according to the present invention, it is possible to provide an image pickup apparatus having an optical path reflecting zoom lens system which is advantageous for securing an optical performance while securing an image angle and a zooming ratio, and which is advantageous for water proofing and dust proofing without the lens being protruded out at the time of start-up of the image pickup apparatus.

What is claimed is:

1. An image pickup apparatus having an optical path reflecting zoom lens system, comprising:

a zoom lens system; and an image pickup element which is disposed at an image side of the zoom lens system, and which changes an image formed by the zoom lens system, to an electric signal, wherein the zoom lens system comprises in order from an object side thereof a first lens unit having a positive refracting power, which includes a reflecting optical member having a reflecting surface which reflects an optical path, a second lens unit having a negative refracting power, a third lens unit having a positive refracting power, a fourth lens unit having a positive refracting power, and an aperture stop which is disposed between the second lens unit and the fourth lens unit, and the first lens unit has a position fixed with respect to a position of the image pickup element, and at least the second lens unit and the fourth lens unit are movable, and at the time of zooming from a wide angle end to a telephoto end, by changing a distance between the each of lens units, the second lens unit consists in order from the object side a negative lens element, a positive lens element, and a negative lens element.

2. The image pickup apparatus having an optical path reflecting zoom lens system according to claim 1, wherein the positive lens in the second lens unit is cemented to at least one of the two negative lenses in the second lens unit.

3. The image pickup apparatus having an optical path reflecting zoom lens system according to claim 2, wherein the positive lens in the second lens unit is cemented to only a negative lens on an image side, out of the two negative lenses in the second lens unit.

4. The image pickup apparatus having an optical path reflecting zoom lens system according to claim 1, wherein the image pickup apparatus having an optical path reflecting zoom lens system satisfies the following conditional expression $$2.0 < f_1/f_w < 5.0 \qquad (1)$$

where, $f_1$ denotes a focal length of the first lens unit, and $f_w$ denotes a focal length of the entire zoom lens system, at a wide angle end.

5. The image pickup apparatus having an optical path reflecting zoom lens system according to claim 1, wherein the image pickup apparatus having an optical path reflecting zoom lens system satisfies the following conditional expression $$35° < \tan^{-1}(IH_w/f_w) \qquad (2)$$

where, $IH_w$ denotes a maximum image height at a wide angle end, and $f_w$ denotes a focal length of the entire zoom lens system at the wide angle end.

6. The image pickup apparatus having an optical path reflecting zoom lens system according to claim 1, wherein the third lens unit has a position fixed with respect to a position of the image pickup element at the time of zooming.

7. The image pickup apparatus having an optical path reflecting zoom lens system according to claim 1, wherein the first lens unit includes in order from an object side
a front lens component having a negative refracting power,
a reflecting optical member, and
a rear lens component having a positive refracting power, and
the reflecting optical member is a prism having a rear surface as a reflecting surface.

8. The image pickup apparatus having an optical path reflecting zoom lens system according to claim 7, wherein the front lens component of the first lens unit is one negative lens.

9. The image pickup apparatus having an optical path reflecting zoom lens system according to claim 8, wherein the image pickup apparatus having an optical path reflecting zoom lens system satisfies the following conditional expression $$1.0<|f_{L1n}/f_w|<3.0 \quad (3)$$

where,
$f_{L1n}$ denotes a focal length of the negative lens of the front lens of the front lens component in the first lens unit, and
$f_w$ denotes a focal length of the entire zoom lens system, at the wide angle end.

10. The image pickup apparatus having an optical path reflecting zoom lens system according to claim 8, wherein the image pickup apparatus having an optical path reflecting zoom lens system satisfies the following conditional expression $$N_{1d}>1.9 \quad (4)$$

where,
$N_{1d}$ denotes a refractive index of the negative lens of the front lens component in the first lens unit, with respect to a d-line.

11. The image pickup apparatus having an optical path reflecting zoom lens system according to claim 7, wherein the rear lens component in the first lens unit is one positive lens.

12. The image pickup apparatus having an optical path reflecting zoom lens system according to claim 11, wherein the image pickup apparatus having an optical path reflecting zoom lens system satisfies the following conditional expression $$1.2<|f_T/f_{L1p}|<2.0 \quad (5)$$

where,
$f_T$ denotes a focal length of the entire zoom lens system at a telephoto end, and
$f_{L1p}$ denotes a focal length of the positive lens of the rear lens component in the first lens unit.

13. The image pickup apparatus having an optical path reflecting zoom lens system according to claim 1, wherein the image pickup apparatus having an optical path reflecting zoom lens system satisfies the following conditional expression $$0.8<|f_2/f_w|<2.0 \quad (6)$$

where,
$f_2$ denotes a focal length of the second lens unit, and
$f_w$ denotes a focal length of the entire zoom lens system at a wide angle end.

14. The image pickup apparatus having an optical path reflecting zoom lens system according to claim 1, wherein the zoom lens system comprises a fifth lens unit which is disposed at an image side of the fourth lens unit.

15. The image pickup apparatus having an optical path reflecting zoom lens system according to claim 14, wherein the fifth lens unit has a positive refracting power.

16. The image pickup apparatus having an optical path reflecting zoom lens system according to claim 14, wherein the fifth lens unit has a positive refracting power.

17. The image pickup apparatus having an optical path reflecting zoom lens system according to claim 14, wherein the fifth lens unit comprises at least one aspheric surface.

18. The image pickup apparatus having an optical path reflecting zoom lens system according to claim 14, wherein the fifth lens unit moves at the time of focusing.

19. The image pickup apparatus having an optical path reflecting zoom lens system according to claim 14, wherein
in the telephoto end state with respect to the wide angle end state,
the second lens unit is positioned at an image side,
the fourth lens unit is positioned at an object side,
a distance between the first lens unit and the second lens unit increases,
a distance between the second lens unit and the third lens unit decreases,
a distance between the third lens unit and the fourth lens unit increases, and
a distance between the fourth lens unit and the fifth lens unit decreases.

20. An image pickup apparatus having an optical path reflecting zoom lens system, comprising:
a zoom lens system; and
an image pickup element which is disposed at an image side of the zoom lens system, and which changes an image formed by the zoom lens system, to an electric signal, wherein
the zoom lens system comprises in order from an object side thereof
a first lens unit having a positive refracting power, which includes a reflecting optical member having a reflecting surface which reflects an optical path,
a second lens unit having a negative refracting power,
a third lens unit having a positive refracting power,
a fourth lens unit having a positive refracting power,
a fifth lens unit having a positive refracting power, and
an aperture stop which is disposed between the second lens unit and the fourth lens unit, and
the first lens unit has a position fixed with respect to a position of the image pickup element, and
at least the second lens unit and the fourth lens unit move, and
the zooming is carried out from a wide angle end to a telephoto end by changing a distance between the various lens units, and the zoom lens system satisfies the following conditional expressions $$2.0<f_1/f_w<5.0 \quad (1), \text{ and}$$

$$35°<\tan^{-1}(IH_w/f_w) \quad (2)$$

where,
$f_1$ denotes a focal length of the first lens unit,
$f_w$ denotes a focal length of the entire zoom lens system, at a wide angle end, and
$IH_w$ denotes a maximum image height at a wide angle end.

21. The image pickup apparatus having an optical path reflecting zoom lens system according to claim 20, wherein the second lens unit consists in order from an object side thereof
a negative lens, and
a cemented lens of a positive lens and a negative lens.

* * * * *